United States Patent
Tellado et al.

(10) Patent No.: US 6,512,797 B1
(45) Date of Patent: Jan. 28, 2003

(54) PEAK TO AVERAGE POWER RATIO REDUCTION

(75) Inventors: Jose Tellado, Stanford, CA (US); John M. Cioffi, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/081,493

(22) Filed: May 19, 1998

Related U.S. Application Data

(63) Continuation-in-part of application No. 09/062,867, filed on Apr. 20, 1998.

(51) Int. Cl.[7] .................................. H04L 5/12
(52) U.S. Cl. ................. 375/261; 375/298; 370/319; 370/333; 370/334; 455/102; 455/103; 455/115; 455/126
(58) Field of Search ................. 375/261, 275, 375/297, 298; 370/310, 319, 330, 333, 334, 430, 480; 455/102, 103, 115, 116, 126, 127

(56) References Cited

U.S. PATENT DOCUMENTS

| | | | |
|---|---|---|---|
| 5,268,938 A | | 12/1993 | Feig et al. |
| 5,282,222 A | | 1/1994 | Fattouche et al. |
| 5,285,474 A | | 2/1994 | Chow et al. |
| 5,302,914 A | * | 4/1994 | Arntz et al. ............... 330/129 |
| 5,598,436 A | | 1/1997 | Brajal et al. ............... 375/297 |
| 5,621,762 A | | 4/1997 | Miller et al. ............... 375/298 |
| 5,835,536 A | * | 11/1998 | May et al. ................. 375/316 |
| 5,838,732 A | | 11/1998 | Carney ...................... 375/297 |
| 6,125,103 A | * | 9/2000 | Bauml et al. .............. 370/203 |
| 6,175,551 B1 | * | 1/2001 | Awater et al. ............. 370/210 |

FOREIGN PATENT DOCUMENTS

| | | |
|---|---|---|
| WO | WO 95/17049 | 6/1995 |
| WO | WO 98/10567 | 3/1998 |

OTHER PUBLICATIONS

Mathias Friese, "OFDM Signals with Low Crest–Factor", Nov. 1997, Globecom, pp. 290–294.
Stefan Miller, et al., "A Comparison of Peak Power Reduction Schemes for OFDM", Nov. 1997, Globecom, pp. 1–5.
Alan Gatherer et al., "Controlling Clipping Probability in DMT Transmission", Nov. 1997, Askomar, pp. 578–584.
Jacky S. Chow et al., "Mitigating Clipping Noise in Multi–Carrier Systems", Jun. 1997, ICC, pp. 715–719.
S.H. Müller et al., "OFDM with Reduced Peak–to–Average Power Ratio by Optimum Combination of Partial Transmit Sequences", Feb. 27, 1997, Electronics Letters, vol. 33, No. 5, pp. 368–369.

(List continued on next page.)

*Primary Examiner*—Stephen Chin
*Assistant Examiner*—Dac V. Ha
(74) *Attorney, Agent, or Firm*—Beyer Weaver & Thomas, LLP

(57) ABSTRACT

The present inventions provide methods and systems for reducing the peak to average power ratio of a multi-carrier signal. Reducing the peak to average power ratio of a signal ensures that amplifiers and transmitters are not saturated, causing loss of data. Further, reducing peak to average power ratios reduces the consumption of power during transmission. Peak to average power ratios are reduced by applying a peak reduction signal component to one or more of the plurality of information signals that make up the multi-carrier signal. In one embodiment the peak reduction signal is a basis function of the communication system. The information signal is mapped to duplicate constellation points, which may be easily decoded by a receiver by performing a modulo operation. Negation of the peaks may be performed iteratively to remove any peaks produced during prior peak reduction operations.

67 Claims, 20 Drawing Sheets

OTHER PUBLICATIONS

M. Friese, "Multicarrier Modulation with Low Peak–to–Average Power Ratio", Apr. 11, 1996, Electronics Letters, vol. 32, No. 8, pp. 713–714.

Denis J.G. Mestdagh, "A Method to Reduce the Probability of Clipping in DMT–Based Transceivers", Oct. 1996, IEEE Transactions on Communications, vol. 44, No. 10, pp. 1234–1238.

D. Wulich, "Reduction of Peak to Mean Ratio of Multicarrier Modulation Using Cyclic Coding", Feb. 29, 1996, Electronics Letters, vol. 32, No. 5, pp. 432–433.

A.E. Jones et al., "Blockcoding Scheme for Reduction of Peak to Mean Envelope Power Ratio of Multicarrier Transmission Schemes", Dec. 8, 1994, vol. 30, No. 25, pp. 2098–2099.

* cited by examiner

PEAK TO AVERAGE POWER RATIO REDUCTION

CROSS-REFERENCE TO RELATED APPLICATIONS

This is a continuation-in-part of U.S. patent application Ser. No. 09/062,867, entitled "Peak to Average Power Ratio Reduction", by Jose Tellado and John M. Cioffi, filed Apr. 20, 1998, Attorney Docket No. STFUP010, which is incorporated herein by reference in its entirety.

BACKGROUND OF THE INVENTION

This invention relates generally to communication systems. The present invention relates more specifically to reducing peak to average power ratios in single carrier and multi-carrier communication systems.

In recent years multi-carrier communication systems have received more attention.

Multi-carrier communication systems offer the promise of increased bandwidth combined with two-way communications.

However, several problems still remain to be solved to ensure the widespread use of multi-carrier communication systems. One concern is how to reduce the peak to average power ratio of a multi-carrier transmission.

Referring to FIG. 1, a multi-carrier transmission is composed of a number of independent signals. FIG. 1 is a frequency domain plot of several signals 10(1)–10(n). Each signal 10(1)–(n) is centered a different frequency f(1)–f(n). Often times the frequencies are equally spaced apart. The frequencies are commonly referred to as carrier frequencies.

In most multi-carrier communication systems the signals 10(1)–(n) are combined together as a vector. An inverse fast fourier transform (IFFT) is usually performed on the vector to produce a discrete time domain signal which is converted to a continuous time domain signal and transmitted. FIG. 2 illustrates a continuous time domain representation of a typical output signal 30 of a multi-carrier transmitter.

Signal 30 contains a number of peaks 31–34. A problem with the output signal is that the peaks 31–34 often times exceeds the output capabilities of the transmitter. If the transmitter is only capable of transmitting at amplitudes of up to +/−10 dB, the peaks saturate the transmitter and the peaks are cutoff in the transmitted signal. Saturation causes the transmitted signal to lose a significant amount of information, which may or may not be corrected for by the receiver. Thus, it is important to reduce the peaks in order to maintain the integrity of the transmitted signal.

Reducing the peak to average power ratio of a signal requires that the number and magnitude of the peaks are reduced. There have been several attempts to reduce peak to average power ratios, although they are only successful to a certain extent.

The placement of the different signals 10(1)–(n) at different carrier frequencies f(1)–f(n) affects the shape of the output signal 30. One method randomly shuffles the phase of the signals 10(1)–10(n) at each carrier frequency f(1)–f(n). Random shuffling does not completely eliminate the problem, although randomizing has been shown to somewhat reduce the peak to average power ratio to an extent. Random shuffling also requires performing an additional IFFT. In addition to not completely reducing the peak to average power ratio to a practical point, that particular method also requires that additional information, side information, be sent along with the transmitted signal. In order for the receiver to be able to decode the transmitted signal the receiver must also know how the signals 10(1) –10(n) were randomized. Thus, the randomization scheme requires extra bandwidth to transmit the side information and does not effectively reduce the peak to average power ratio.

Another method has been applied to multi-carrier communication systems that use a small number of carrier frequencies. In that method all the different possible outputs of each signal 10(1)–10(n) are simulated. For example, if each signal 10(1)–(n) is a 4-ary quadrature amplitude modulated signal, each signal would be one of four different waveforms. If there are ten carrier frequencies, then over a million combinations are simulated. Those combinations of the outputs of signals 10(1)–(n) that exhibit peak to power ratios that exceed a specified limit are not used in actual transmissions. Typically, a channel must be simulated periodically because of changes in the channel's characteristics.

The elimination of some of the possible combinations of the outputs of the signals, however, reduces the bandwidth of the communication scheme. Further, the method can only be applied to communication systems that use a few carriers since the number of simulations required increases exponentially with an increase in the number of carriers. That is, if M-ary QAM and N frequencies are used, $N^M$ combinations must be simulated. M can be as high as 1024 and N even larger. Thus, this method becomes impractical when even a moderate number of carriers are used.

A third method involves performing inverse fast fourier transforms on subsets of the signals 10(1)–(n). For example, an IFFT may be performed on the first one fourth signals, another IFFT for the second one fourth, and etc. The four output signals may then be linearly combined to provide one output signal. Reducing the number of carriers within a single IFFT output reduces the peak to average power ratio for that output signal since there are fewer signal components. The linear combinations are compared to determine which combination has the best PAR.

As the number of signals and carriers increase the number of IFFTs that must be performed on the subsets of the signals increase, according to the number of signals incorporated within a single IFFT. The complexity of the transmitter thereby increases by the number of IFFTs that must be performed, compared to a single IFFT. Further, information about the linear combination of the transmitted signal must also be passed along to the receiver. This information is even more vital, and usually requires additional bandwidth to ensure proper reception and decoding of the information.

In yet another method of reducing peak to average power ratio, the output signal of an IFFT of all the signal components is scaled to bring the peaks below the maximum level. A problem with this solution is that the signal to noise ratio is reduced proportionally with the scaled factor. Reducing the signal to noise creates a great number of other problems which makes this method unattractive. For example, as the signal to noise ratio decreases more errors occur during transmission.

What is desired is a method of reducing the peak to average power ratio of a transmission within a multi-carrier communication system. A method without a significant decrease in the amount of usable bandwidth, and with low complexity such that reduction of the peak to average power ratio may be performed in real time, is also desirable.

SUMMARY OF THE INVENTION

The present inventions provide methods and systems for reducing the peak to average power ratio of a single carrier or multi-carrier signal. Reducing the peak to average power ratio of a signal ensures that amplifiers and transmitters are not saturated, causing loss of data. Further, reducing peak to average power ratios reduces the consumption of power during transmission.

Peak to average power ratios are reduced by selecting a subset of a plurality of frequencies that make up a multi-carrier symbol. Peak reduction signals, carried at the subset of frequencies, are computed to reduce the PAR of the symbol.

In one embodiment, a kernel is generated that has components in the subset of frequencies. The kernel is adjusted to negate one or more peaks in the multi-carrier symbol. The adjustment of the kernel creates a subset of signals of a plurality of signals centered at the plurality of frequencies. Negation of the peaks may be performed iteratively to remove any peaks produced during prior peak reduction operations.

In one embodiment, the subset of frequencies are chosen prior to transmission. In alternate embodiments, the subset of frequencies may be reselected during communication.

The subset of frequencies may be chosen to obtain a kernel that may better negate the peaks of the multi-carrier symbol. In one embodiment the subset of frequencies may be chosen based upon the characteristics of the channel. In other embodiments, the subset of signals may be chosen randomly, pseudo-randomly, or combinations thereof.

In another embodiment the peak to average power ratios of a signal that may be a single carrier or multi-carrier signal may be performed by applying a basis function to the signal. For multi-carrier signals, a peak reduction signal is applied to one or more of the information signals that make up the multi-carrier signal. The peak reduction signal is composed of one or more kernels. The kernel is a basis function of the communication system. The application of the basis function maps the information signal from an original constellation point to a duplicate constellation point. A receiver decodes the information signal by mapping the duplicate constellation point back to the original constellation point. The method of decoding may be accomplished by performing a modulo operation on the received modified information signal.

These and other advantages of the present invention will become apparent to those skilled in the art upon a reading of the following descriptions of the invention and a study of the several figures of the drawing.

BRIEF DESCRIPTION OF THE DRAWINGS

FIG. 13 illustrates a receiver in accordance with an embodiment of the present inventions.

DETAILED DESCRIPTION OF THE PRESENT INVENTIONS

The present inventions provide apparatuses and methods of reducing peak to average power ratios in single carrier and multi-carrier communication systems without significantly reducing the amount of bandwidth. The present inventions may also be implemented with a low amount of complexity such that they may be implemented in real time. Additionally, no significant amount of side information is required, which would reduce bandwidth, nor is there a reduction in the signal to noise ratio or quality of service.

The present inventions apply to any type of communication systems utilizing multiple carriers. By way of example, the present inventions apply to Discrete Multi-Tone (DMT), Orthogonal Frequency Division Multiplexing (OFDM), Discrete Wavelet Multi-Tone (DWMT) communication systems, Vector Coding Modulation. Alternate embodiments of the present inventions apply to single carrier communication systems, such as Carrier-less Amplitude Phase (CAPs), vestigial side band, amplitude modulation and the like.

Figure 1:
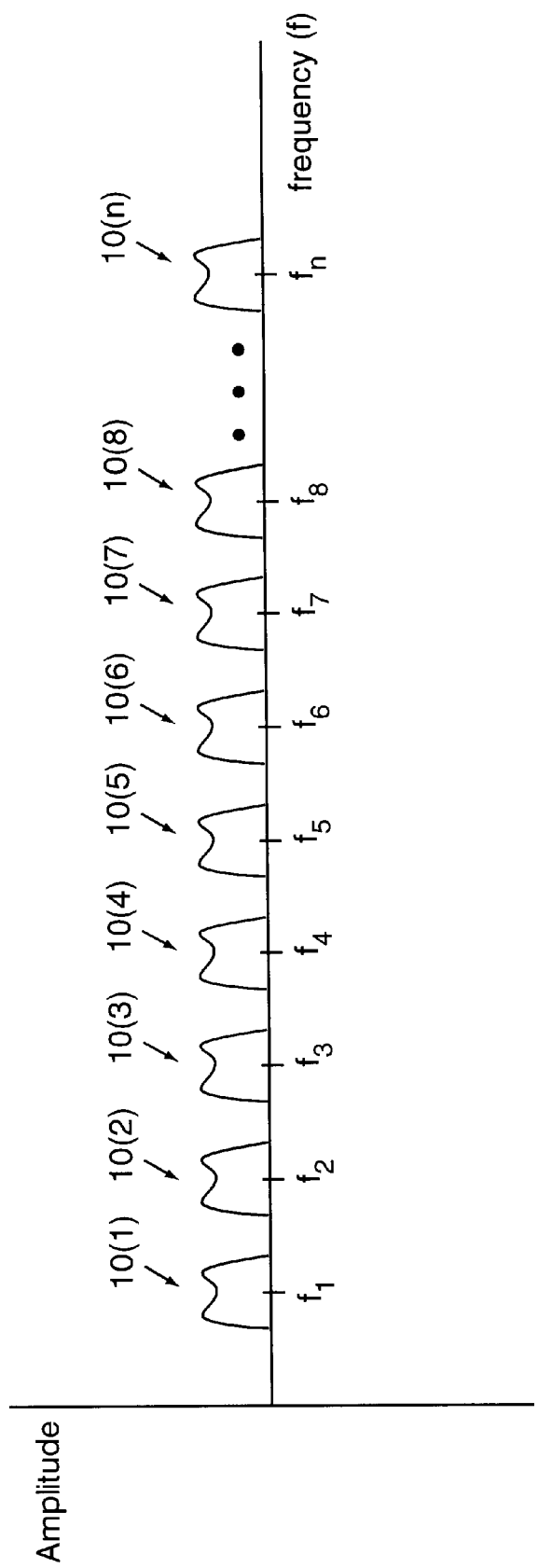
FIG. 1 illustrates a frequency domain plot of several signals of a multi-carrier communication system.
Figure 2:
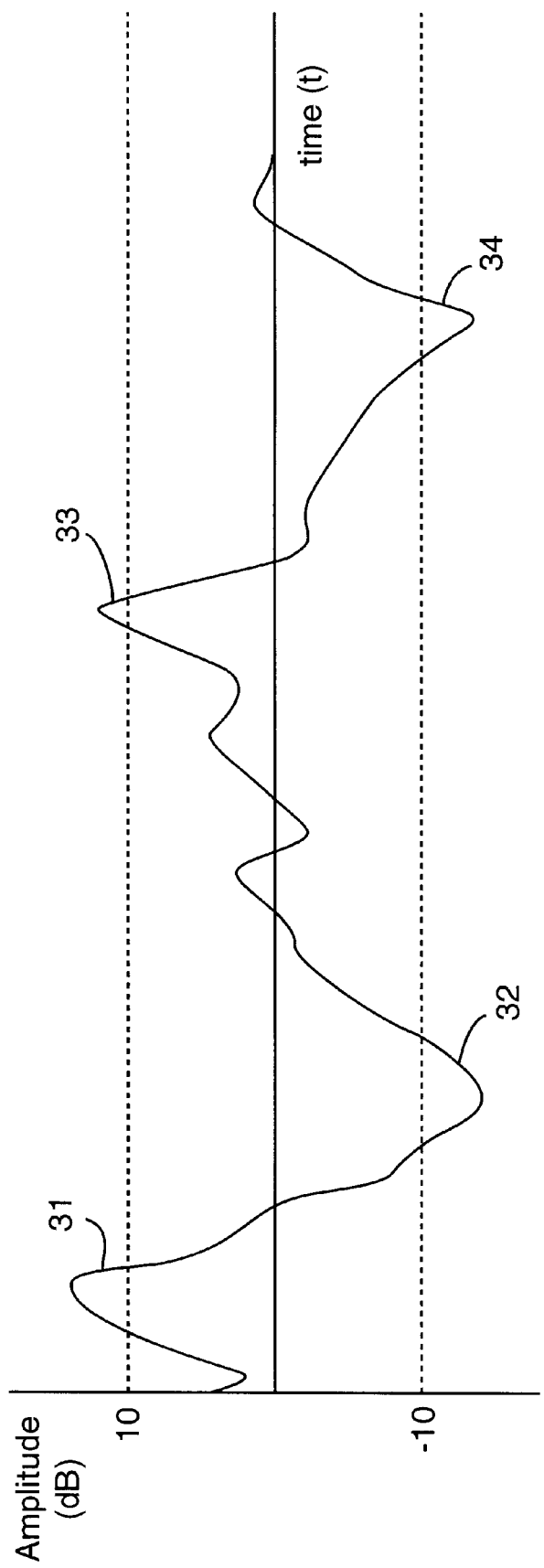
FIG. 2 illustrates a continuous time domain representation of a typical output signal of a multi-carrier transmitter.
Figure 3:
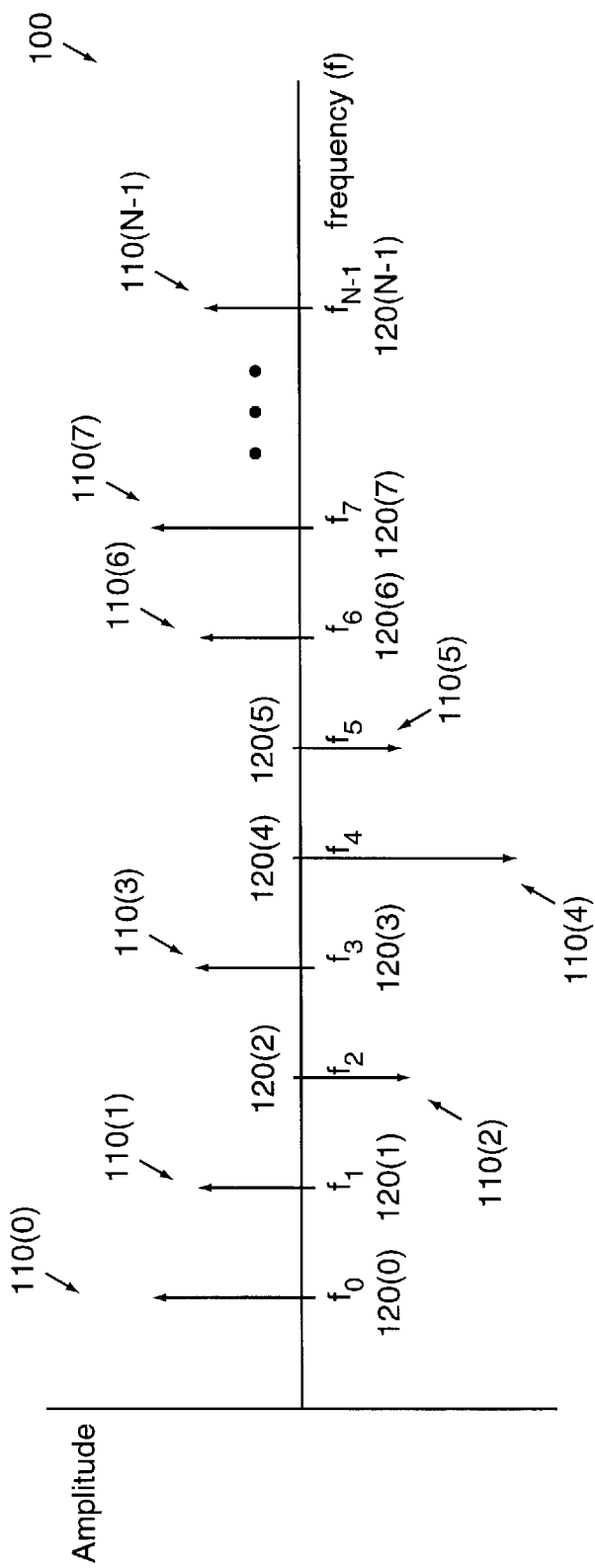
FIG. 3 illustrates a frequency domain plot of a DMT symbol prior to applying an inverse fast fourier transform.

Referring to FIG. 3, a multi-carrier communication system takes advantage of a channel by sending several signals over a wide band of frequencies. FIG. 3 is a frequency domain plot of a DMT symbol 100 prior to applying an inverse fast fourier transform. The DMT symbol is a function of a number of signals 110(0)–110(N–1), each centered at a different frequency 120(0)–(N–1). While details of the present inventions are discussed in terms of a DMT communication system, the advantages of the present inventions apply readily to other types of multi-carrier communication systems, and the present inventions are not restricted to only DMT systems.

Each signal 110(0)–(N–1) may carry any number of bits of information in a digital system. By way of example, each signal may be modulated by M-ary quadrature amplitude modulation, M-ary phase shift key, frequency modulation, amplitude modulation, continuous phase modulation or any other type of suitable modulation scheme. The illustrated signals are M-ary quadrature amplitude modulated. Thus, each signal 110(0)–(N–1) has a magnitude and a phase in addition to its frequency.

Figure 4:
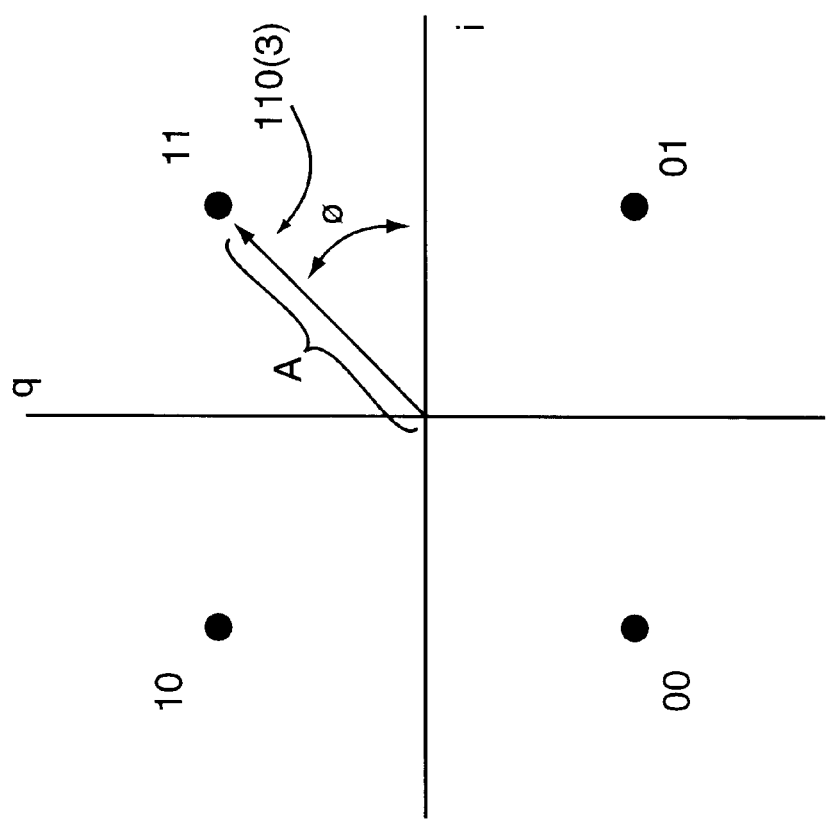
FIG. 4 illustrates a signal constellation of a signal that is 4-ary quadrature amplitude modulated.

FIG. 4 is a signal constellation of signal 110(3) that is 4-ary quadrature amplitude modulated. Signal 110(3) has an amplitude, A, and a phase, $\phi$. Depending upon the amplitude and phase, signal 110(3) may represent one of four binary values, 00, 01, 10 and 11, as illustrated.

Each signal 110(0)–(N–1) are all quadrature amplitude modulated, but may have different constellations. The number of constellation points that a signal represents depends upon the characteristic of the channel for that particular frequency. That is, if frequency 120(4) is less noisy than frequency 120(3), then signal 110(4) may have an 8-ary QAM constellation or greater. Thus, by looking at the characteristics of the channel less noisy frequencies may carry signals that represent a greater number of bits.

In one embodiment of the present inventions, those frequencies that have a lot of noise and are capable of only carrying low bit rate signals are used as peak reduction frequencies. The peak reduction frequencies may carry no signal at all. It has been found that having peak reduction frequencies that carry no signal may sometimes marginally help to reduce the peak to average power ratio of a transmission.

In another embodiment, the peak reduction frequencies carry peak reduction signals. Peak reduction signals, like regular signals, have an amplitude and a phase. However, in one embodiment, the peak reduction signals generally do not carry any data. Rather, the peak reduction signals are scaled and shifted such that the peaks of the output signal are dramatically reduced.

In alternate embodiments of the present inventions, the peak reduction frequencies may be chosen by any suitable method. Frequencies that are noisy are utilized as peak reduction frequencies since the decrease in data rate of the output symbol is minimized. However, a different selection of peak reduction frequencies may provide better peak to average power ratio reduction with fewer peak reduction frequencies. It has been found that randomly selected peak reduction frequencies provides good peak to average power ratio attenuation. Selection of peak reduction frequencies is discussed further below.

Because of the properties of an inverse fourier transform changing the attributes of one or more of the components of a signal before it is inverse fourier transformed effects the transformed signal. In the case of DMT a discrete time signal x is generated from a number of complex valued QAM modulated signals 110(0)–(N–1), or X. Where $$x = [x_1 \ldots x_n \ldots x_N];\text{ and}$$

$$X = [X_1 \ldots X_n \ldots X_N]$$

The elements of X are complex values that represent the amplitude and phase of the signals $X_0$–$X_{N-1}$, where the frequencies $f_0$–$f_{N-1}$ are of equal bandwidth and separated by 1/T, where T is the time duration of a DMT symbol. Each element of x is a symbol derived from X defined by:

$$x_n = \frac{1}{\sqrt{N}} \sum_{k=0}^{N-1} X_k e^{j2\pi kn/N}, k = 0, \ldots, N-1$$

which can be written as x=QX, where Q is the IFFT matrix and the elements of Q are $$q_{n,k} = \frac{1}{\sqrt{N}} e^{j2\pi kn/N}$$

The peak to average power ratio (PAR) of x is then:

$$PAR = \frac{\|x\|_\infty^2}{\epsilon[\|x\|_2^2]/N}$$

where $\|v\|_\infty$ is the $\infty$-norm of the vector v, or the maximum absolute value, $\|v\|_2$ is the 2-norm of the vector v, or the root mean square, and $\epsilon[f(v)]$ is the expected value of the function f(v).

The peak reduction frequencies, once chosen, can be assigned arbitrary amplitudes and phases. In one embodiment, the peak reduction frequencies may be initialized with zero amplitude and zero phase. The values for the peak reduction signals are represented as the vector c in the time domain, and C in the frequency domain, where.

$$x+c=Q(X+C)$$

The possible values for c are chosen such that $$PAR(c^*) = \frac{\min_c \|x+c\|_\infty^2}{\epsilon[\|x\|_2^2]/N} << \frac{\|x\|_\infty^2}{\epsilon[\|x\|_2^2]/N}$$

where c* is the optimal solution for c. The value of the right side of the inequality is the PAR of the signal generated from the vector x, and the left side of the inequality is the PAR of the peak reduced signal generated from the vector x+c.

The values for C at the peak reduction frequencies may be any suitable value that helps to reduce the peaks in the transmitted multi-carrier symbol. However, the values for C at the non-peak reduction frequencies are always zero, such that the values of C do not interfere with X. Thus, $$C_k = \begin{cases} C_k, & k \in \{i_1, ..., i_L\} \\ 0, & k \notin \{i_1, ..., i_L\} \end{cases}$$

Initially, $C_k$ may be set to zero, and the values for $C_k$ changed later to reduce the PAR. L is the number of peak reduction frequencies that are utilized to reduce the PAR of x. If N frequencies are available, then the ratio of peak reduction frequencies to the overall number of frequencies is L/N. However, the actual bandwidth loss is the number of bits that the peak reduction frequencies were capable of carrying over the total number of bits that all N frequencies are capable of carrying. By selecting peak reduction frequencies that are capable of carrying few, or zero, bits per symbol, bandwidth loss is minimized. The non-zero values, $C_k$ for $k \in \{i_1, \ldots, i_L\}$ or $\hat{C}$, are called the peak reduction signals, or peak reduction tones in the case of DMT, or more generally dummy signals.

Figure 5:
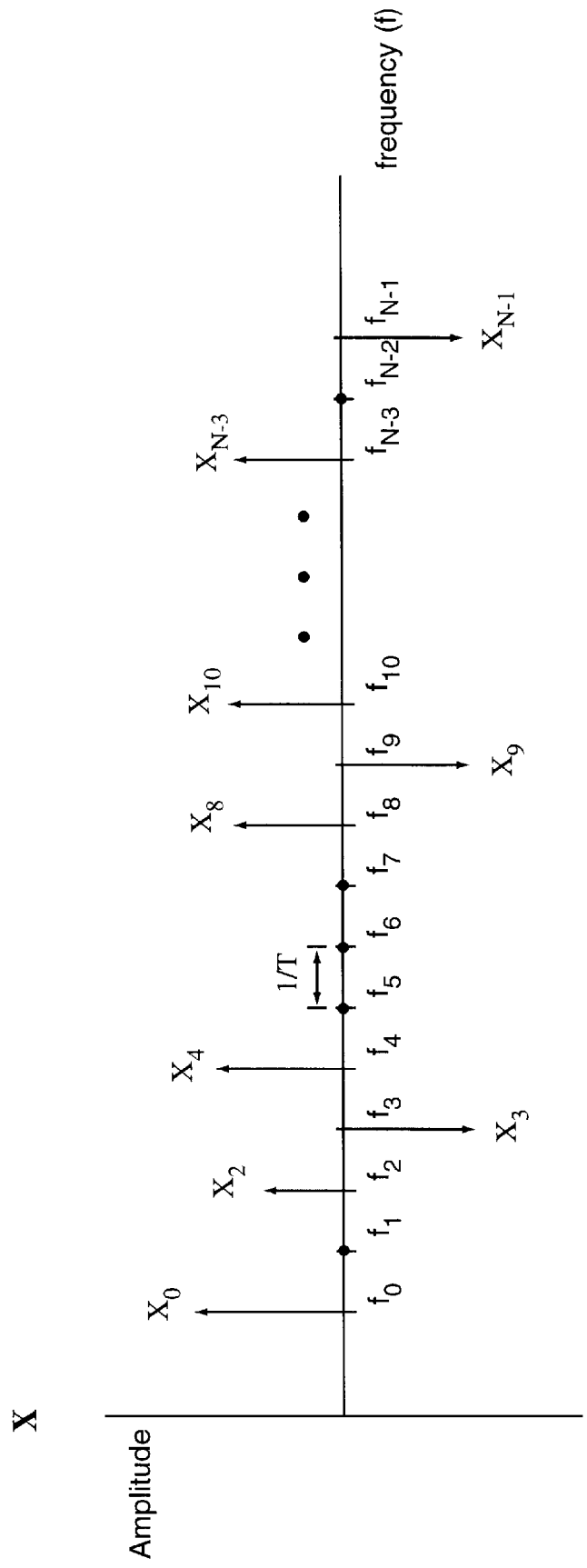
FIG. 5 illustrates a frequency domain representation of X in accordance with an embodiment of the present inventions.
Figure 6:
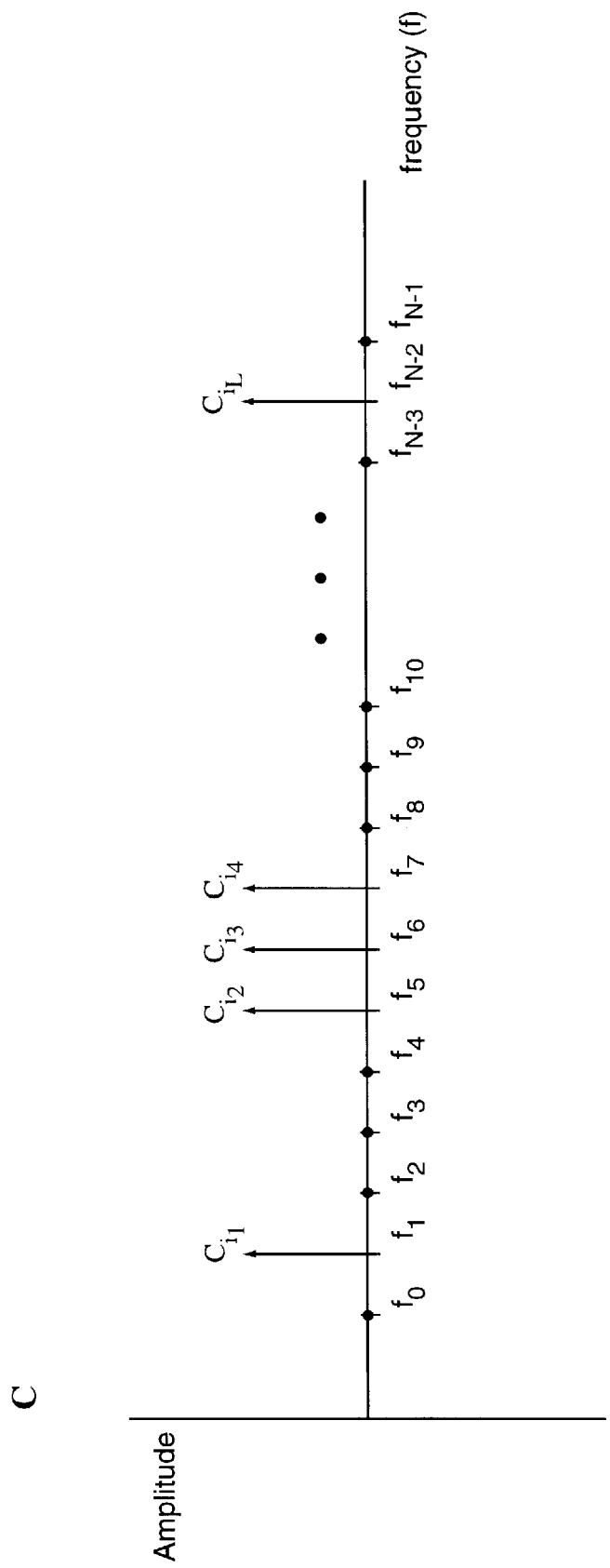
FIG. 6 illustrates the frequency domain representation of C in accordance with an embodiment of the present inventions.

The values for X are zeroed at the peak reduction frequencies. FIGS. 5 and 6 show the frequency domain representations of X and C, respectively, according to one embodiment of the present inventions. The frequencies $f_1$, $f_5$, $f_6$, $f_7$ and $f_{N-2}$ are chosen as peak reduction frequencies. Accordingly, the values for $X_1$, $X_5$, $X_6$, $X_7$ and $X_{N-2}$ are zero. The other values for X correspond to the amplitude and phase of those signals.

In alternate embodiments, only one component of the values of X may be zeroed out and used for peak reduction purposes. By way of example, the real part of the values of $X_1$, $X_5$, $X_6$, $X_7$ and $X_{N-2}$ may be zeroed out and the imaginary part of the components used to carry information. Analogously, one of the phase or amplitude components of the values of X may be zeroed out and used for peak reduction while the other is used to carry information.

The values for C correspond to the peak reduction frequencies. The index i conforms to the peak reduction frequencies, e.g., $i_1$, is the index for the first peak reduction frequency $f_1$, $i_2$ is the index for the second peak reduction frequency $f_5$, and etc.

Figure 7:
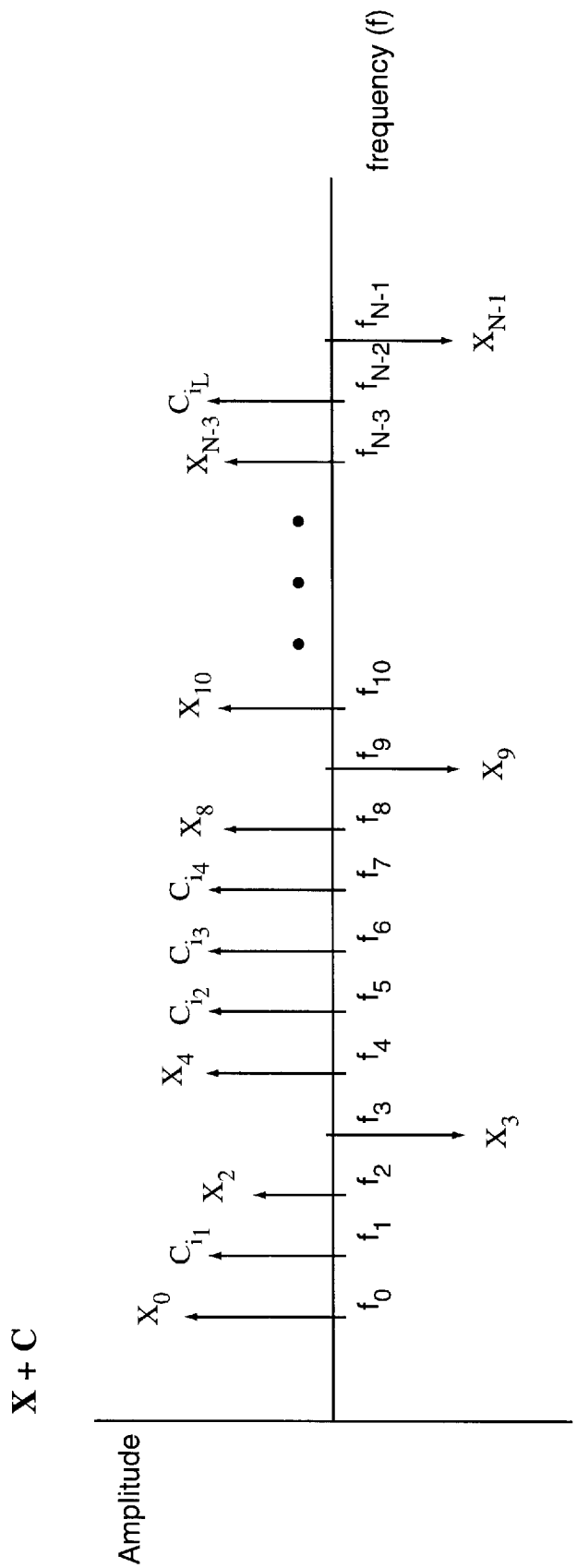
FIG. 7 illustrates the frequency domain representation of X+C in accordance with one embodiment of the present inventions.

FIG. 7 illustrates the frequency domain representation of X+C, in accordance with one embodiment of the present inventions. In the combined signal all the frequencies contain a signal. The non-zero values of peak reduction signals C are located at the peak reduction frequencies, while the actual signals X are located at the non-peak reduction frequencies. Initially, the peak reduction signals C may have any arbitrary values. However, it is useful to initialize the values of C at zero.

Figure 8:
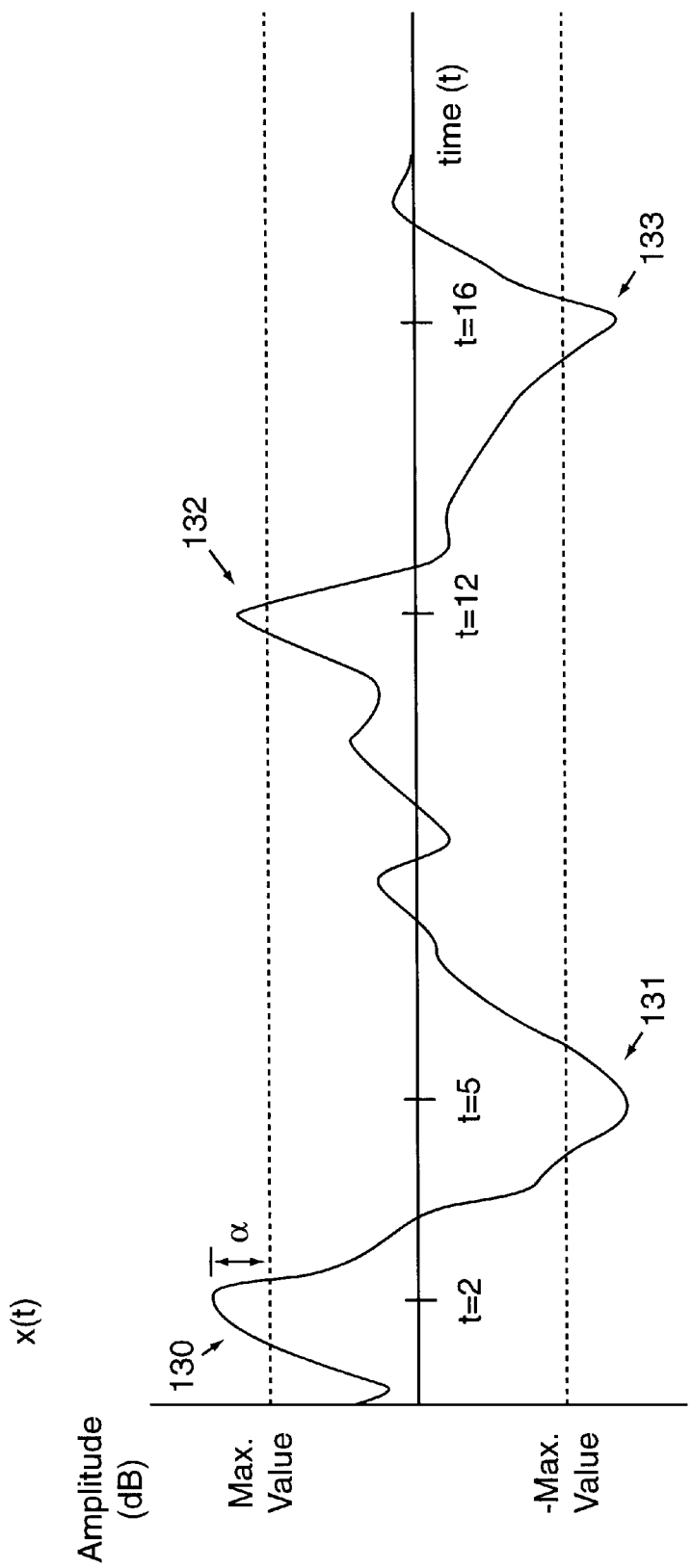
FIG. 8 illustrates the continuous time domain representation of a symbol signal x(t) of a multi-carrier communication system in accordance with an embodiment of the present inventions.
Figure 9:
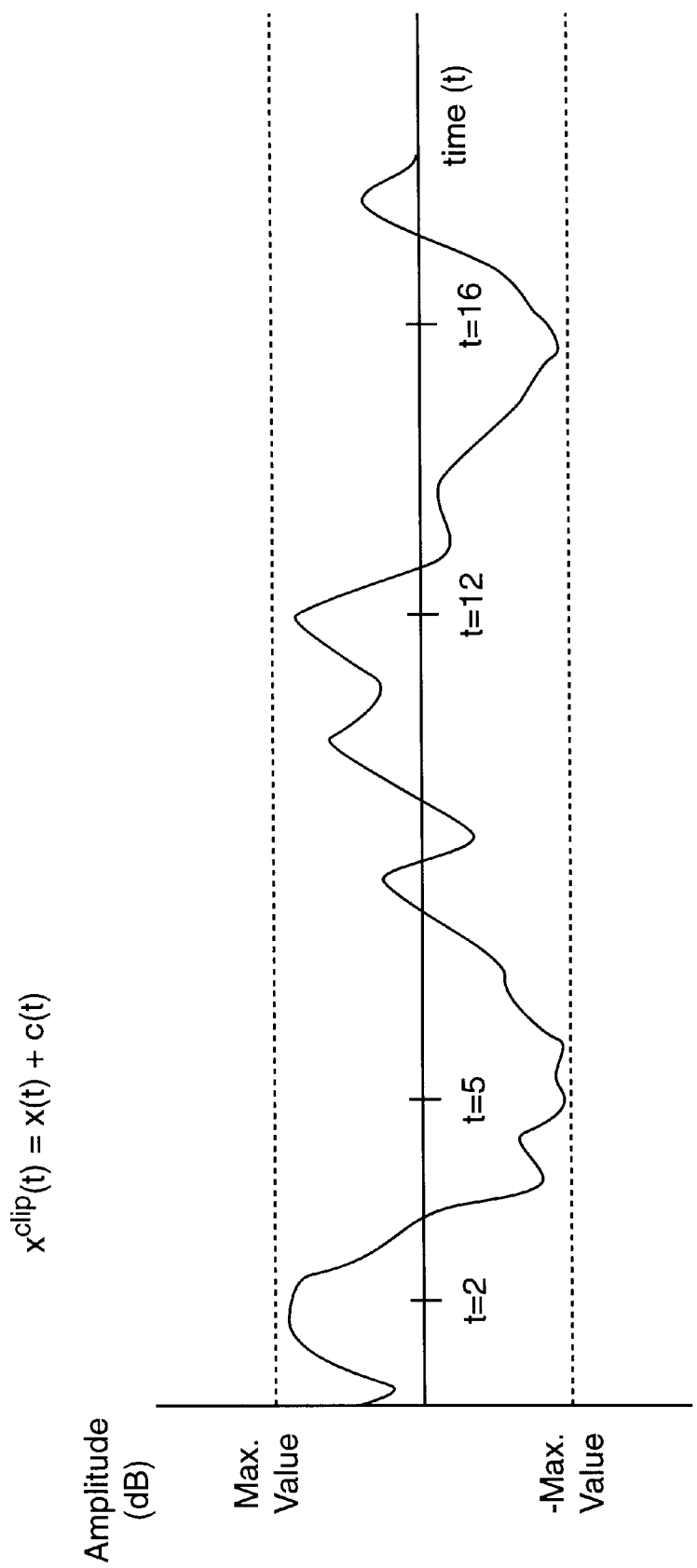
FIG. 9 illustrates a time domain representation of a desired symbol signal $x^{clip}(t)=x(t)+c(t)$ in accordance with an embodiment of the present inventions.

The first set of values of C may then be represented as the initial values C(0)). If C(0)) are zeroes, then X+C(0))=X, and x+c(0))=x. The time domain representation of x+c(0)) is equivalent to the unmodified signal x(t), as illustrated in FIG. 8. However, the values for C should be chosen to provide a signal (x+c) that does not have peaks that exceed a predetermined magnitude. FIG. 9 is a time domain representation of a desired signal $x^{clip}(t)=x(t)+c(t)$ generated by the vector x+c.

The continuous time domain waveforms depicted in FIGS. 8, 9 and other figures are representative of analogous discrete time domain waveforms. A majority of the algorithms used in the present inventions are predominantly performed in discrete time due to practical considerations. The continuous time domain waveforms are used for purposes of illustration. However, the scope of the present inventions includes analogous algorithms performed in continuous time and frequency domains.

The values for C* and c*, the optimal solution that would provide an $x^{clip}(t)$ with the smallest PAR, may be obtained by solving the following equation:

$$\min_c \|x+c\|_\infty = \min_{\hat{C}} \|x + \hat{Q}\hat{C}\|_\infty$$

$\hat{Q}$ is the sub-matrix of Q constructed from the columns $i_1, \ldots, i_L$, and $\hat{C}$ represents the non-zero values of C. c* can actually be solved through linear programming. Solutions may also be found separately for the real and the imaginary parts of x or X.

The above equation may be rewritten in the following form:

$$\min_{\hat{c}} t$$

$$\text{subject to } x + \hat{Q}\hat{C} \leq_N t1_N,$$

$$x + \hat{Q}\hat{C} \geq_N -t1_N$$

Moving all the unknowns to the left hand side, the equations may be rewritten as:

$$\min_{\hat{c}} t$$

$$\text{subject to } \hat{Q}\hat{C} - t1_N \leq_N -x,$$

$$\hat{Q}\hat{C} + t1_N \geq_N -x$$

or $$\min_{\hat{c}} t$$

$$\text{subject to } \begin{pmatrix} \hat{Q} & -1_N \\ -\hat{Q} & -1_N \end{pmatrix} \begin{pmatrix} \hat{C} \\ t \end{pmatrix} \leq_{2N} \begin{pmatrix} -x \\ x \end{pmatrix}$$

The linear program has 2L+1 unknowns {Real($\hat{c}$), Imag ($\hat{c}$), t} and 2N inequalities written in the standard linear program form:

$$\min c^T x$$

$$\text{subject to } Ax \leq_N b$$

Linear programming algorithms exist to solve for c*. The linear programming solutions provide the ideal solution c*. Currently, the exact solution approach is most practical in communication systems operating at data rates of approximately 500 kbps or lower because of the amount of computations required to compute the exact solution for c*. However, good approximations of c* may be obtained such that the PAR of x can be satisfactorily reduced in real time for higher data rate systems. However, as processing power becomes more readily available in the future the linear programming solution may be utilized in multi-carrier communication systems operating at higher speeds in accordance with the present inventions.

Approximating c, C

As seen in FIG. 8, the time domain signal x(t) has several peaks 130–133. The peaks 130–133 can be reduced by adding or subtracting an appropriately scaled impulse function $\delta(t)$ at those peak time values. The impulse function, however, must be constructed from the peak reduction frequencies, $\{i_1, i_2, \ldots, i_L\}$. Since a true impulse function cannot be created by less than all the frequency components, i.e., when L<N, an approximate impulse must be used, p.

Figure 10:
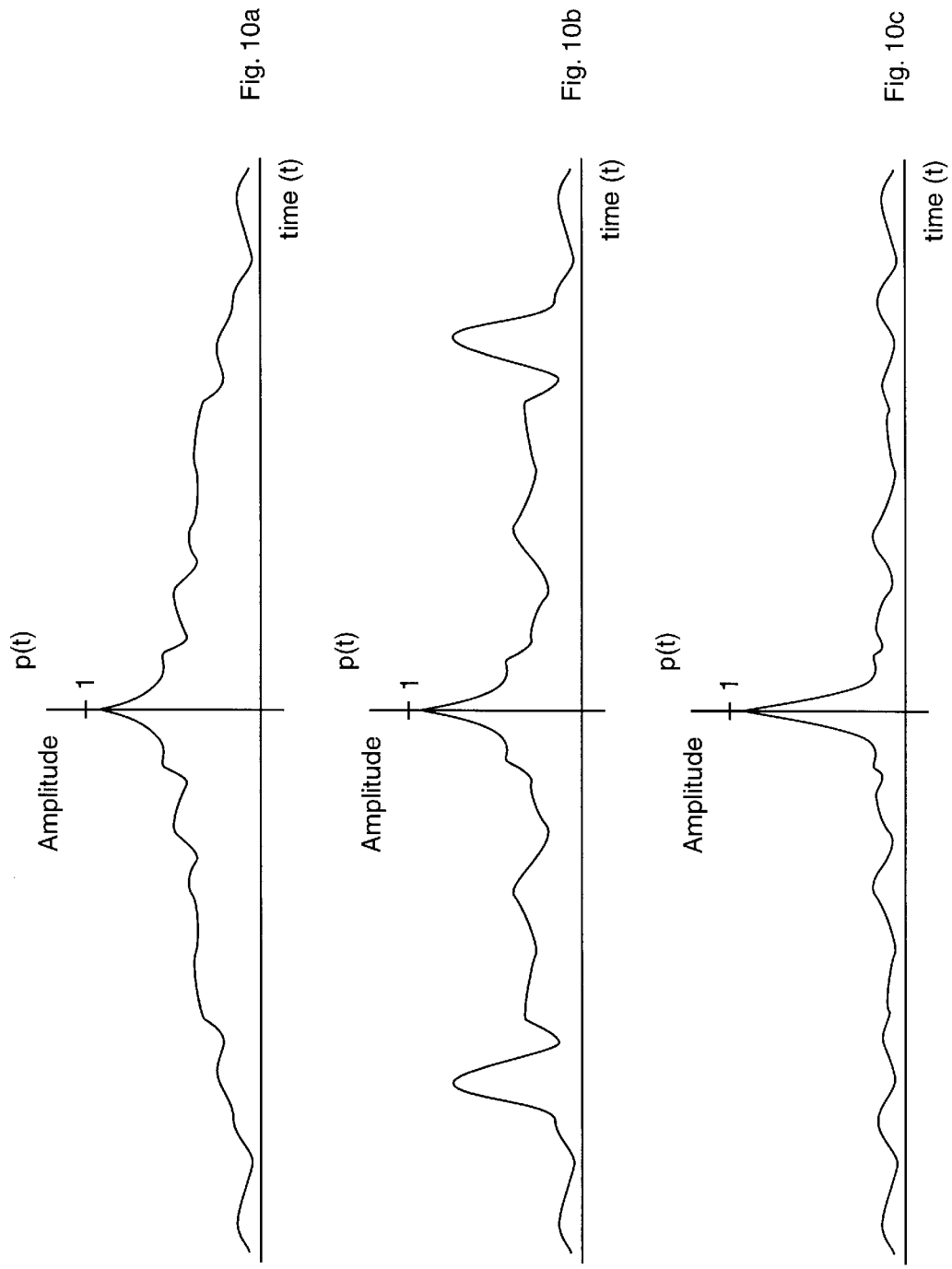
FIGS. 10A–C illustrate several approximate impulse functions p(t) in accordance with an embodiment of the present inventions.

FIGS. 10a–c illustrate several approximate impulse functions p(t), generated from different values of p, in accordance with one embodiment of the present inventions. Since only the L peak reduction frequencies can be used to create the approximate impulse function p(t), or kernel, p(t) is not ideal. One useful constraint that may be placed upon p(t) is that the value for p(0) is equal to one. This allows p(t) to be scaled more readily.

FIG. 10a may be a first approximation of an impulse. The lobes around the impulse should however be reduced in magnitude. The side lobes should be reduced to ensure that when the impulse is applied to x(t) to clip a particular peak no other portion of x(t) exceed the maximum value. Another approximation of an impulse may look like the approximation in FIG. 10b. Obviously, the secondary peaks of FIG. 10b poses a problem when applied to x(t). Ideally, p(t) should resemble the waveform depicted in FIG. 10c.

Solving for the mean square error between $p=\hat{Q}\hat{P}$ and an ideal discrete time impulse $e_0=[1\ 0\ \ldots\ 0]^T$ provides the solution for an approximation of p that is the mean square error. The mean square error minimizes the sum of all the peaks of the kernel, or power, other than the peak at p(0).

$$\hat{P}_2^b = \arg\min_{\hat{P}} \|\hat{Q}\hat{P} - e_0\|_2^2,$$

$$p_2^b = \hat{Q}\hat{P}_2^b$$

The solution becomes:

$$\hat{P}_2^b = (\hat{Q}^T\hat{Q})^{-1}\hat{Q}^T e_0 = \hat{Q}^T e_0 = \frac{1}{\sqrt{N}}[1\ldots 1]^T = \frac{1}{\sqrt{N}}1_L$$

$$p_2^b = \frac{1}{\sqrt{N}}\hat{Q}1_L$$

Since the value for $p_0$ should be equal to one we can scale the result to obtain the mean square error optimal solution for p, p*.

$$\hat{P}_2^* = \frac{\sqrt{N}}{L}1_L$$

$$p_2^* = \frac{\sqrt{N}}{L}\hat{Q}1_L$$

Since P has non-zero values only at the peak reduction frequencies, C may be represented as any suitable linear combination of P. The linear combinations of P correspond to the scaled and shifted versions of the kernel, p, such that the scaled and shifted versions of p negate the peaks of x. For example, if p(t) of FIG. 10c were to be applied to x(t) of FIG. 8, p(t) would be inverted and shifted to t−2 in order to cancel out the first peak 130. Also, if the first peak 130 exceeded the maximum value by some factor α, p(t−2) would be scaled by a value greater than α, such as (1.2α). When x(t) and (1.2α)p(t−2) are added the value at t=2 would be the maximum value +α−1.2α, which gives us a value less than the maximum value (maximum value −0.2α). The scaling and time shifting of p merely scales and phase shifts the values of P, and therefore $\hat{C}$. $\hat{C}$, which is a linear combination of P, will have zero values at the non-peak reduction frequencies.

Any number of peaks may be clipped in this fashion in one iteration. However, reducing one or more peaks may cause the resulting waveform to exceed the maximum value at other positions. Therefore, the process may be repeated with the resulting $x^{clip}$+c to achieve a new $x^{clip}$ with a PAR that is satisfactory.

In order to minimize the second highest peak of p(t), thereby reducing all the peaks other than the peak at p(0), a linear program may be used to solve for the infinite norm equation.

$$\hat{P}_\infty^* = \arg\min_{\hat{P}}\|[p_1 p_2 \ldots p_{N-1}]\|_\infty^2, \text{ subj. to } p_0=1$$

$$p_\infty^* = \hat{Q}\hat{P}_\infty^*$$

$p_\infty^*$ provides the optimal solution, producing a p(t) that resembles the waveform illustrated in FIG. 10c.

The solution of p regardless of its order may be computed in advance, or off-line, since only the peak reduction frequencies need to be known. Thus, p may be predetermined once the peak reduction frequencies have been chosen. Once p is known, p may be linearly combined in any fashion to produce the necessary values for c and C. The resulting c is a good approximation of c* depending upon the number of iterations performed.

In one embodiment, the choice of the peak reduction frequencies may be based upon obtaining a good kernel, p. Once the number of peak reduction frequencies, L, has been determined, the location of the peak reduction frequencies may be determined based upon deriving a good, or the best, kernel, p. Certain quality factors may be imposed before accepting a p as a valid kernel. By way of example, a p with secondary peaks greater than a predetermined magnitude may be rejected. That set of peak reduction frequencies may then be rejected and a new set of peak reduction frequencies selected to provide a better p.

It has been found that randomly selected peak reduction frequencies will often times provide a good kernel. If a first set of peak reduction frequencies chosen randomly does not provide a good kernel, a new selection of peak reduction frequencies that swap a subset of the first randomly chosen peak reduction frequencies sometimes provides a better kernel. The combinations of peak reduction frequencies may be iteratively evaluated until a kernel with the appropriate characteristics is obtained.

In another embodiment, peak reduction frequencies may be chosen based upon the bit rates of the frequencies. In one instance, a pseudo-random selection of the peak reduction frequencies may be performed with weights applied to those frequencies that have low bit rates that make the selection of those frequencies more likely. If after several iterations a proper kernel, p, cannot be obtained the weights may be adjusted since the weighted frequencies may not be good candidates for constructing a proper kernel.

After the peak reduction frequencies have been chosen the optimal, or a good approximation of the optimal kernel is computed. Using the resulting kernel, p, the peak reduction vector c, containing the peak reduction signals, or peak reduction signals, may be constructed. Initially, the vector x+c(0), where the values of c(0) is all zeroes, is computed by taking the IFFT of the vector X, containing zero values in the peak reduction frequencies. If only one peak is negated during a single iteration of applying the kernel, p, is performed $x^{clip}(1)=x+c(1)$, where $c(1)=A_1p[(n-\Delta_1)]_N$ in the discrete time domain, where is A a scaling factor and Δ is a time shift. If two peaks are canceled in one iteration $x^{clip}(1)=x+c(1)$, where $c(1)=A_1p(n-\Delta_1)+A_2p(n-\Delta_2)$, and so on.

Any number of peaks may be canceled in a single iteration. Obviously, canceling more peaks requires more computations per iteration without being able to readily determine if the multiple application of several scaled and/or shifted kernels have not introduced newly created peaks. Thus, in one embodiment, it may be advantageous to limit the number of peaks per iteration. Once an iteration is complete the kernels may be linearly combined to produce c(j), where j is the current iteration. After computing c(j) and adding it to x, the new $x^{clip}$, $x^{clip}(j)$, can be reevaluated to determine if further peaks require cancellation.

Further iterations may be performed by taking the previous $x^{clip}$ and adding another set of values for c, i.e., $x^{clip}(j)=x^{clip}(j-1)+c(j)$. Since the values of x remain the same because p and P are only functions of the peak reduction frequencies this sum expands to $$x^{clip}(j) = x + c(0) + c(1) + \ldots + c(j-1) + c(j), \text{ or}$$

$$x^{clip}(j) = x + \sum_{m=0}^{j} c(m), \text{ and}$$

$$c^* = \sum_{m=0}^{j} c(m), \text{ as } j \to \infty$$

The sum of c's is equal to a number of scaled and/or shifted kernels, p. If only one peak is corrected (only one peak is canceled) per iteration then the equation becomes:

$$x^{clip}(j) = x + A_1 p[(n-\Delta_1)]_N + A_2 p[(n-\Delta_2)]_N + \ldots + A_{j-1} p[(n-\Delta_{j-1})]_N + A_j p[(n-\Delta_j)]_N, \text{ or}$$

$$x^{clip}(j) = x + \sum_{m=0}^{j} A_m p[(n-\Delta_m)]_N$$

Thus, c is computed simply by performing multiplies and adds, and does not require any additional transforms, which are significantly more computationally intensive. Thus, the present inventions require significantly fewer computational resources than other methods that have been used to reduce the PAR of a multi-carrier signal.

The process may be repeated indefinitely until the summation of c approaches the optimal peak reduction signal vector c*. But a good approximation of c* may be obtained in as little as one or two iterations. The quality of c depends upon the quality of the kernel p, which depends upon the number and location of the peak reduction frequencies. Thus, as L, the number of peak reduction frequencies increases towards N, the total number of frequencies, better approximations of c* are obtained in fewer iterations.

By way of example, four iterations at one kernel application per iteration when the ratio of L/N is 5% has produced good results. Application of the present inventions with higher L/N ratios produce better results with fewer iterations.

In alternative embodiments, discussed further below, it be helpful to know the values of C once c has been computed. In those cases a fourier transform of c provides the values for C. Since c does not contain any frequency components in the non-peak reduction frequencies the fourier transform of the entire signal x+c need not be computed. Further, if operations are performed on C in order to provide better performance or added functionality the inverse fourier transform of C may be taken to obtain a new c. The new c can be added to x to provide the new $x^{clip}$. Again, the inverse transform of X is not needed. Thus, even when additional transforms are utilized the transformation operations are simpler than transforming the entire signal.

Once $x^{clip}$ is determined it is transmitted to a receiver. The receiver, or demodulator, decodes $x^{clip}$. A fourier transform is performed on the decoded signal. The values of the peak reduction signals at the peak reduction frequencies are discarded since they typically do not carry any information. The values of $X_{received}$ are then further decoded to extract the information carried by those multiple carriers.

In alternate embodiments, the peak reduction signals may include some type of additional information. In those embodiments the peak reduction signals, $C_{received}$, are also decoded.

Figure 11:
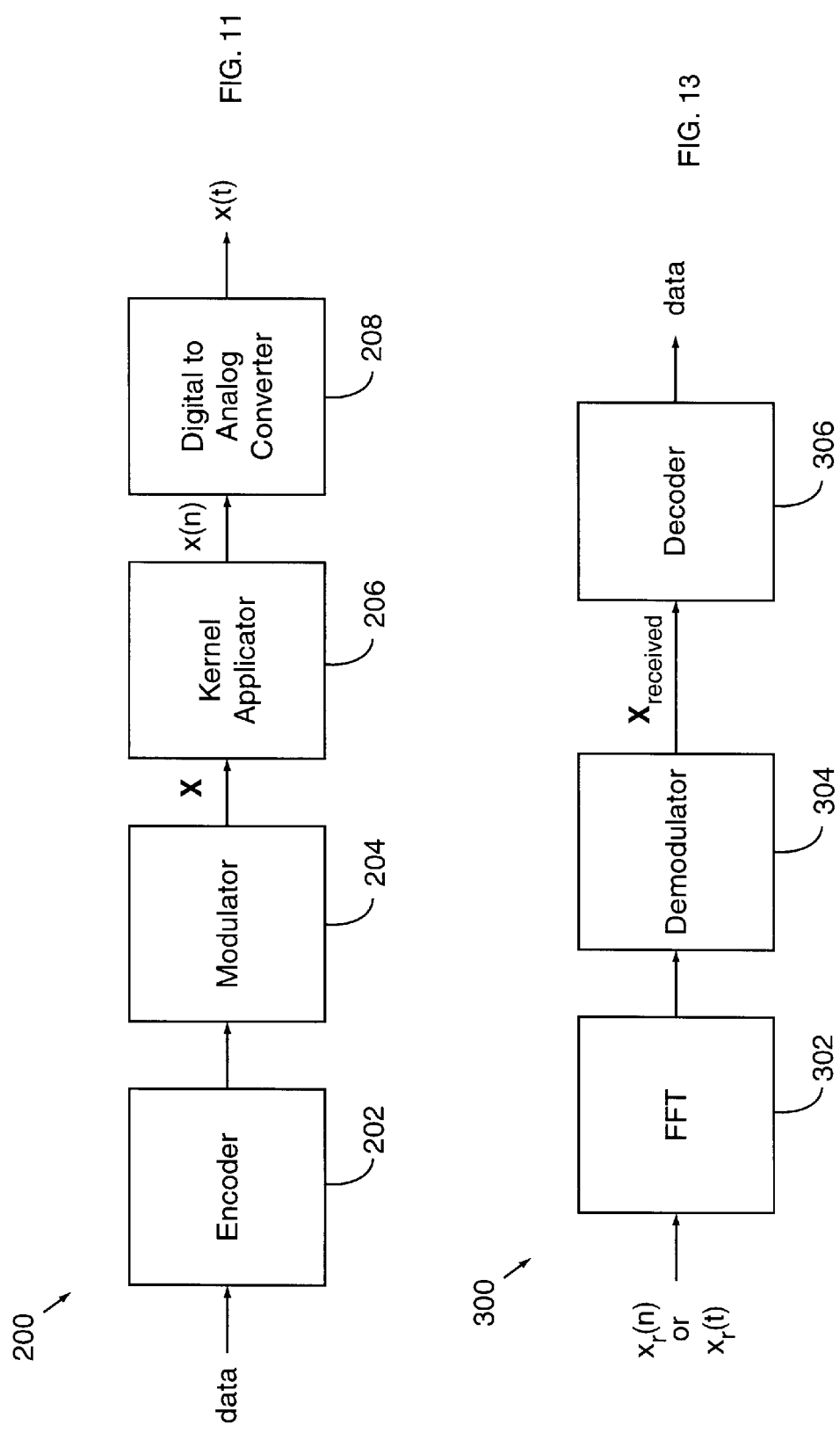
FIG. 11 illustrates a multi-carrier transmitter in accordance with an embodiment of the present inventions.

FIG. 11 illustrates a multi-carrier transmitter in accordance with an embodiment of the present inventions. Transmitter 200 includes an encoder 202, modulator 204, kernel applicator 206 and a digital to analog converter 208. Encoder 202 receives a stream of digital data and encodes the data such that it can be transmitted over several different carriers. The encoder 202 provides the segmented data to modulator 204. Modulator 204 modulates the segmented data using an appropriate modulation scheme, such as QAM. The individually modulated signals are combined together as a vector to produce a single frequency domain signal, X. Certain predetermined frequencies, peak reduction frequencies, are not used.

Modulator 204 provides the frequency domain signal, X, to kernel applicator 206. Kernel applicator 206 performs an inverse fourier transform to X to obtain x, which also modulates the signals to the frequencies $f_0$–$f_{N-1}$. Kernel applicator 206 adds peak reduction signals, c, to x in order to reduce the PAR of x. Initially, the peak reduction frequencies and a kernel are predetermined, as discussed above. The choice of peak reduction frequencies, in one embodiment, may be based upon the characteristics of the channel. In alternate embodiments, the frequencies are chosen purely randomly, randomly with weights applied to frequencies with low bit rates, according to channels that are not utilized by the particular communication system, or any other suitable method.

Once kernel applicator 206 has finished reducing the peak to average power ratio of the signal x, it provides x as another symbol of the discrete time sequence, $x^{clip}(n)$ to digital to analog converter (DAC) 208. DAC 208 converts the discrete time signal to a continuous time domain signal $x^{clip}(t)$. The DAC may also include filters or other signal processing components.

The waveform of $x^{clip}(t)$ has peaks that predominantly does not exceed a predetermined maximum magnitude. Currently, it is desirable to limit the peaks of $x^{clip}(t)$ to below 8–12 dB. However, the present inventions may provide better PAR reduction depending upon the number of peak reduction frequencies and iterations. By way of example, with a L/N ratio of 20% the PAR of a signal may be reduced to about 6 dB or lower within a finite number of iterations. With proper peak to average power ratio reduction $x^{clip}(t)$ resembles the waveform illustrated in FIG. 9 as opposed to the waveform illustrated in FIG. 8, which represents x(t) without the application of a kernel.

Figure 12:
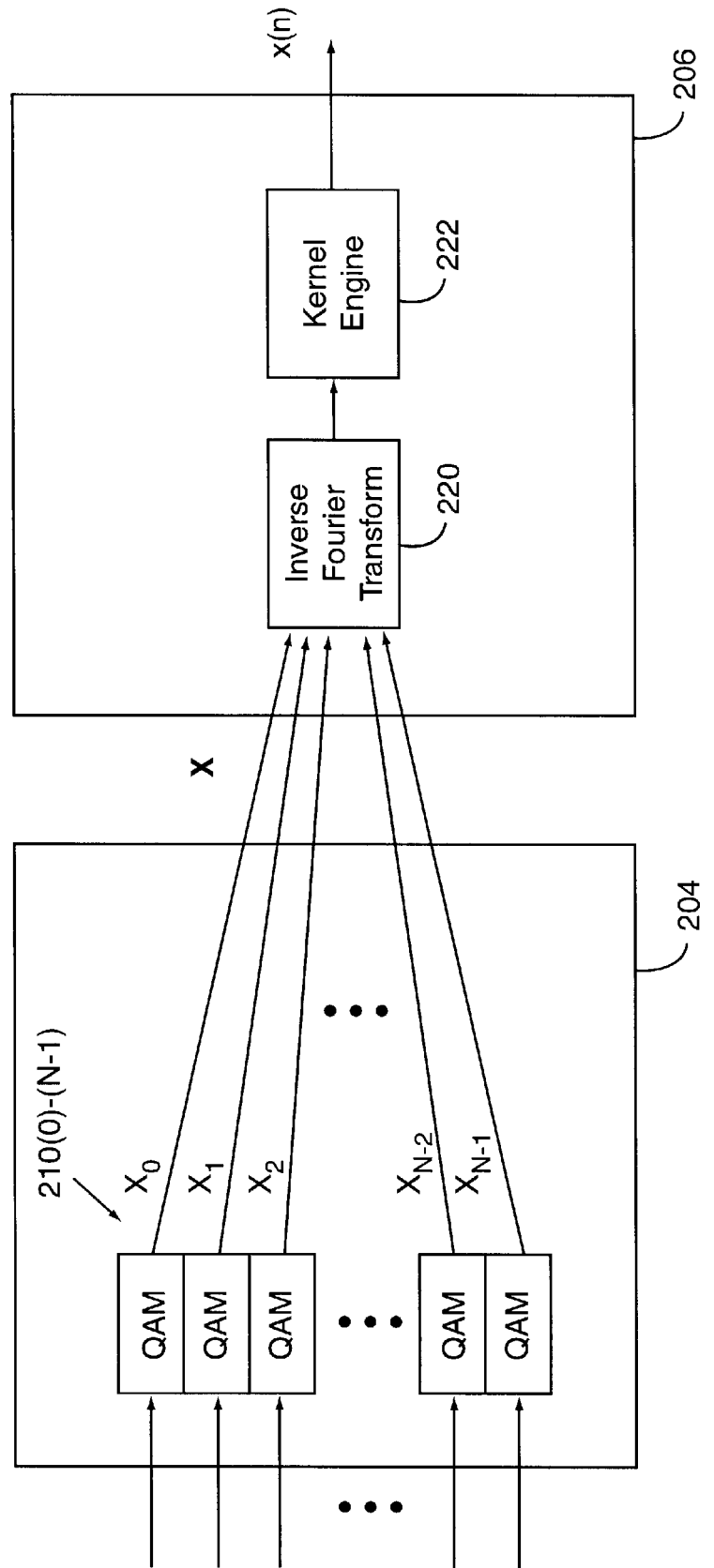
FIG. 12 illustrates block diagrams of the modulator and the kernel applicator of FIG. 11 in accordance with an embodiment of the present inventions.

FIG. 12 illustrates block diagrams of modulator 204 and kernel applicator 206 of FIG. 11 in accordance with an embodiment of the present inventions. Encoder 202 segments the data and provides the data to modulator 204. Modulator 204 includes a number of modulators 210(0)–(N-1). Modulator 204 modulates the separate data streams with modulators 210(0)–(N-1). Modulators 210(0)–(N-1) modulate the individual data streams by the appropriate modulation scheme.

In the illustrated embodiment the data streams are modulated by an M-ary QAM scheme. However, any suitable type of modulation scheme may be utilized in accordance with the present inventions. The output of modulators 210(0)–(N–1) provide the components of X, $X_1$–$X_N$.

In an alternate embodiment, modulator 204 may also modulate the data segments to the frequencies $f_0$–$f_{N-1}$. The modulated signals may be summed to produce x. This type of modulation does not require an inverse fourier transform to obtain x, and x is directly fed to the kernel applicator.

Selection of the peak reduction frequencies are made in advance. The modulators 210(0)–(N–1) corresponding to the peak reduction frequencies do not receive data from encoder 202. Rather, the peak reduction modulators are set to an initial value, such as zero amplitude and phase.

Inverse fast fourier transformer (LFFT) 220 transforms X to provide the discrete time equivalent x. IFFT 220 passes x to kernel engine 222, which applies a kernel to discrete time equivalent x. The particular kernel is also computed beforehand based upon the selection of the peak reduction frequencies. The kernel engine 222 analyzes x to determine how the kernel should be scaled and time delayed to remove the peaks in x. The scaled and delayed kernel is added to x resulting in $x^{clip}$=x+c. c is a linear combination of one or more kernels that have been scaled and time delayed to negate one or more peaks in x. Kernel engine 222 outputs $x^{clip}$ as part of the overall discrete time data stream x(n).

The value of c may result from one iteration of applying one or more kernels to x. Alternatively, c may be accumulated over several iterations of applying the kernel to x. Iteration is useful because the first iteration may negate the original peaks of x, but may also create other peaks due to the imperfection of the kernel.

In the illustrated embodiment, more than one iteration of applying a kernel to x is performed. Kernel engine 222 provides the values of c(j), the newest linear combination of the kernel. In one embodiment c(j) may be the accumulated linear combination including past iterations of applying the kernel. If no further iterations are necessary x+c is provided to DAC 208.

Once DAC 208 converts the discrete time signal into a continuous time signal, the continuous time signal may be transmitted to a receiver through a channel. Again, DAC 208 may perform additional filtering and signal processing.

FIG. 13 illustrates a receiver in accordance with an embodiment of the present inventions. Receiver 300 includes a FFT 302, a demodulator 304 and a decoder 306. Before FFT 302 receives the received signal $x_r(t)$, the received signal may have been passed through filtering and/or other signal processing. The received signal may also be converted from analog to digital, providing a discrete time domain received signal $x_r(n)$.

FFT 302 applies a fourier transform to the received signal to produce $X_r$, which is provided to demodulator 304 and $C_r$. $X_r$ provides the values of the data signals centered at the non-peak reduction frequencies of $f_0$–$f_N$. The elements of $X_r$ are further decoded to extract the data carried by those signals.

$C_r$ is typically discarded if the peak reduction signals do not carry any information and are not further decoded. However, in alternate embodiments where $C_r$ does carry some type of information those components of the received signal may be decoded as well.

In one embodiment, a number of band pass filters centered at frequencies $f_0$–$f_N$ are applied to $X_r$ to extract the different frequency components of $X_r$. Individual demodulators then demodulate the band passed signals to extract the separate data streams. The data streams are recombined to reproduce the original data stream.

Figures 14, 15:
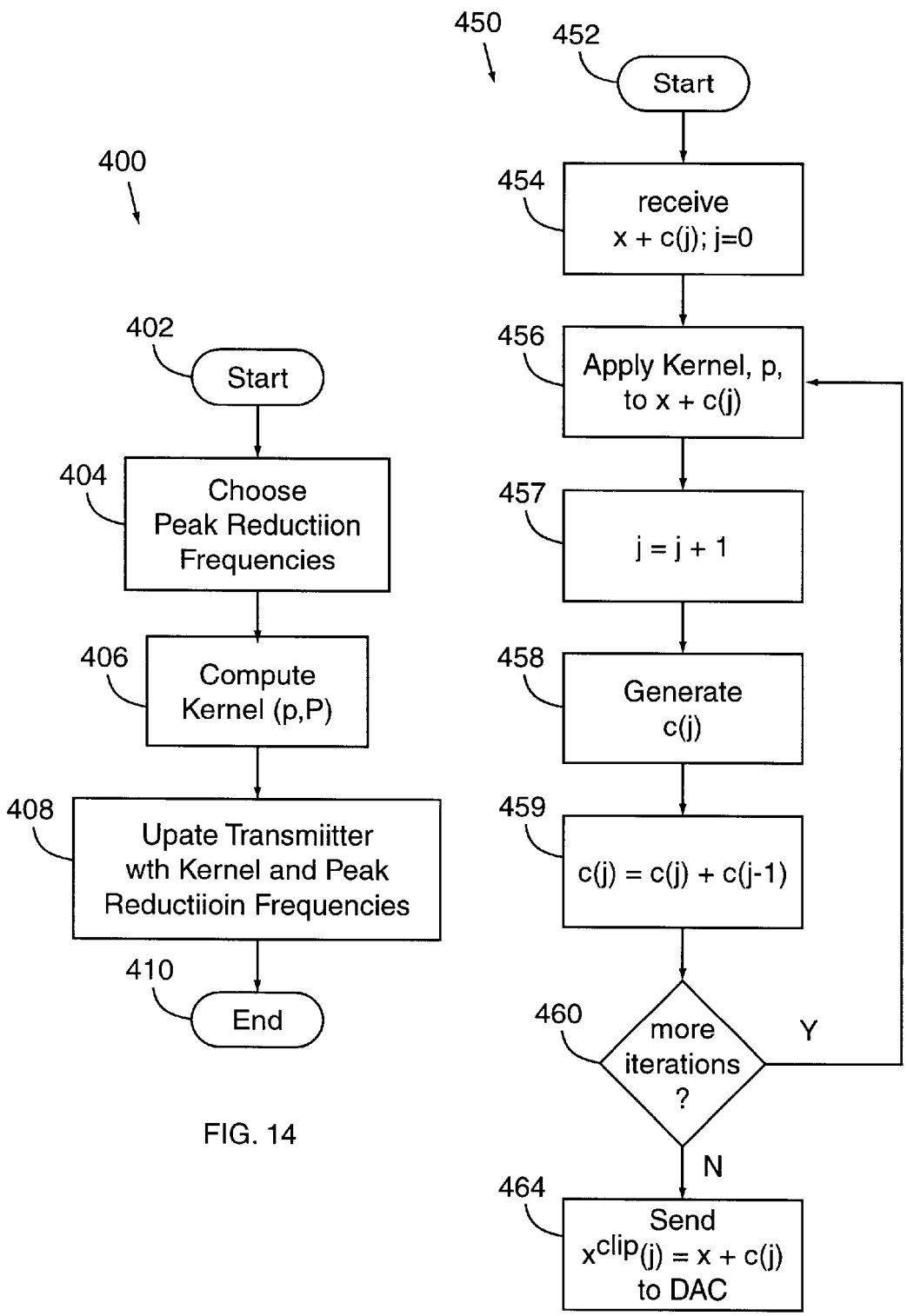
FIG. 14 illustrates the preliminary process of determining the peak reduction channels in accordance with an embodiment of the present inventions.
FIG. 15 illustrates a flow chart of the operation of the kernel engine of FIG. 12 in accordance with an embodiment of the present inventions.

FIGS. 14 and 15 illustrate flow charts describing the process applying a kernel. FIG. 14 illustrates the preliminary process of determining the peak reduction channels. Flowchart 400 begins at block 402 and proceeds to block 404. In block 404 the peak reduction frequencies are chosen. The peak reduction frequencies may be chosen based upon the characteristics of the channel. As described, frequencies that are capable of handling low bit rates, or no communication at all, may be chosen as peak reduction frequencies.

In an alternative embodiment, the peak reduction frequencies may be chosen randomly. Alternatively, the frequencies may be chosen pseudo-randomly with weights applied to the low bit rate frequencies to make their selection more likely. Higher frequencies tend to be noisier frequencies in many applications and the peak reduction channels may be chosen primarily in the higher frequencies. But, in many cases peak reduction frequencies that are sequentially grouped may provide less PAR reduction than randomly selected peak reduction frequencies. The choice of peak reduction frequencies should, however, be made in light of obtaining a sufficient kernel to perform adequate PAR reduction.

The number of peak reduction frequencies compared to the number of overall frequencies is also determined. A greater number of peak reduction frequencies provides better performance. However, as the number of peak reduction frequencies increases more bandwidth is lost to the peak reduction signals. Thus, a tradeoff must be made between performance and bandwidth. A ratio of peak reduction frequencies to overall frequencies of about 5% has been found to provide good performance while minizimizing the loss of bandwidth. However, any suitable ratio may be used depending upon the needs of the system.

Proceeding to block 406 a kernel is computed from the chosen peak reduction frequencies. The above described algorithm may be used to compute a best approximation of an impulse. The computation of the kernel may also be performed by linear programming. In block 408 the chosen peak reduction frequencies and the computed kernel are applied to the relevant parts of the transmLitter. By way of example, the encoder and modulator are configured to modulate data at the non-peak reduction frequencies. The kernel information is supplied to the kernel engine. The flow chart ends in block 410.

FIG. 15 illustrates a flow chart 450 of the operation of kernel engine 222 of FIG. 12. The flow chart 450 begins in block 452 and proceeds to block 454. In block 454 x is received from IFFT 220. Initially, IFFT 220 provides a peak reduction component, c(0), that is zeroed out.

In block 456 the kernel engine analyzes x+c(j) and applies one or more kernels to x+c(j) to reduce any peaks. In the first pass $x^{clip}$(j)=x+c(j); j=0. The kernel engine may negate one, two, or as many peaks as desired in one iteration. However, the more peaks that are canceled in a single iteration the more computation that is required. A tradeoff may be made based upon the available computational resources and the need for better performance.

In block 457 the index j is incremented. Proceeding to block 458 the kernel engine translates the scaling and shifting of the kernel into values for c(j). In block 459 the new peak reduction components are accumulated by adding the previous peak reduction components; c(j)=c(j–1).

The kernel engine determines whether more iterations are required in block 460. If no other iterations are required the current $x^{clip}$(j)=x+c(j), is passed on to DAC 208 in block 464, where c(j) is the accumulated sum of all the iterations of applying the kernel. When further iterations are required, flow proceeds to back to block 456.

The operations of flow chart 400 of FIG. 14 may be performed before any transmissions occur. The operations may also be performed periodically during transmission as well. Whenever the characteristics of the channel changes new peak reduction frequencies may be chosen, and a new kernel calculated. The transmitter may be updated on the fly, without significantly interrupting communications.

Of course, the receiver must know which frequencies are peak reduction frequencies. That information is transmitted to the receiver before communications with a new set of peak reduction frequencies begin. The information about the identity of the peak reduction frequencies is small and does not significantly affect the bandwidth of communications. The peak reduction frequencies information is also intermittent, occurring rarely. By way of example, peak reduction frequencies may be chosen in increments of minutes, hours, days, weeks, months or years, depending upon the stability of the channel. Even if re-selection of the peak reduction frequencies occurs every few minutes, the data would not prohibitively burden the bandwidth of the communication system. In many applications the selection of peak reduction frequencies and a corresponding kernel need only be computed once, during initialization of a communication system.

The operations of the transmitter may be performed by discrete components or more general purpose devices. By way of example, a digital signal processor may perform any or all of the functions of the encoder, modulator, and the kernel applicator. However, more specialized devices may provide better performance.

In certain situations the average distribution of energy may be higher in the peak reduction frequencies than the non-peak reduction frequencies. To alleviate this potential concern a repeating pattern of peak reduction frequencies and kernels may be used for success symbols transmitted. A first symbol would use one set of peak reduction frequencies, a second symbol would use another set of peak reduction frequencies, and repeating after the last set of peak reduction frequencies has been used. The receiver would also be informed in advance of the different sets of peak reduction frequencies and synchronized. In this alternate embodiment average energy is more evenly distributed over all the frequencies. Switching between different sets of peak reduction frequencies may also be performed for other reasons besides energy distribution.

The PAR is a time-varying quality and fluctuates per symbol that is transmitted, which depends upon various factors. At times when the PAR of a particular symbol is low the PAR reduction may be turned off for that symbol. This frees up the peak reduction frequencies to carry data. For example, when the PAR is below 10 dB PAR reduction is turned off for that symbol. When the PAR becomes a problem the peak reduction frequencies may then be used for peak reduction. In addition, the number of peak reduction frequencies may be varied depending upon the conditions. Informing the receiver requires very little additional information and does not take up a significant amount of the overall bandwidth of the system.

In a further embodiment, different sets of peak reduction frequencies, and corresponding kernels, are precalculated. During the analysis of a symbol a selection of one of the sets of peak reduction frequencies may be made based upon which set provides the best PAR reduction. In one embodiment, the selection of one of the sets must be transmitted to the symbol, however the bandwidth required for sending the information is low in comparison to other PAR reduction schemes. In other embodiments, the receiver may be able to detect from the transmitted symbol which peak reduction frequencies are being used.

Combined Information and PAR Reduction Signals

As mentioned the peak reduction signals may be used in alternate ways. By way of example, the peak reduction signals may be used for peak reduction and to carry information. In embodiments where the peak reduction and data signals include more than one component, e.g., an amplitude and a phase value, or a real and an imaginary value, one of the two values may be used specifically for peak reduction while the other may be used to carry information. In such embodiments a set of kernels may be computed for increment of delay, rather than one kernel that is shifted. This removes one dimension of variability in the peak reduction signals such that a single component of the peak reduction frequencies may be used for peak reduction and the other component used for other purposes.

In one embodiment of the present inventions, all the frequencies carry information signals. However, a subset of the information signals are augmented to act also as peak reduction signals.

The information signals are modified by adding a basis function of the communication scheme to the information signal. The addition of the basis function maps the original information signal constellation to one or more duplicate constellations. The addition of the basis function also reduces the contribution of the original information signal to the peak to average power ratio of the transmitted symbol. One or more basis functions may be added to the original information signal in order to reduce the peak to average power ratio. The use of basis functions also facilitates decoding of the original information signal by the receiver. The receiver may simply perform a modulo operation on the received modified signal to obtain the original information signal.

For different types of communication systems different basis functions are used. By way of example, Discrete Wavelet Multi-Tone communication systems use a wavelet as the basis function. The present inventions may be applied to any suitable type of communication system that utilize a basis function for encoding information into a signal.

Figure 16:
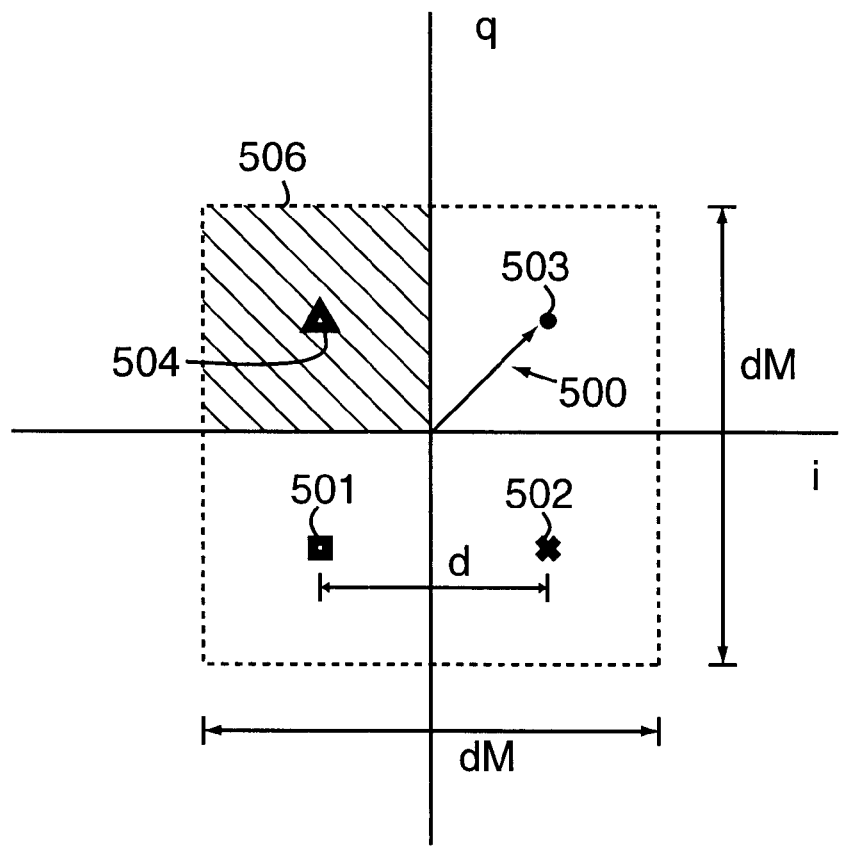
FIG. 16 illustrates a constellation of an information signal in accordance with an embodiment of the present inventions.

FIG. 16 illustrates a constellation of an information signal 500 in accordance with an embodiment of the present inventions. The illustrated constellation is a 4 QAM constellation, including four constellation points 501–504. The signal 500 carries 2b bits of information, where b is the number of bits per dimension. In the illustrated constellation b=1. Thus, the number of potential values is equal to $2^{2b}$, which is equal to four in the illustrated constellation.

Generally, the constellation points are separated by a distance, d, from its nearest neighbor. The dimensions of the constellation is dM by dM, where $M=2^b$ and is the number of levels per dimension. In the illustrated example, d=2 and M=2.

Signal 500 is composed of a real part and an imaginary part, designated by the in-phase (i) axis and the quadrature axis (q), respectively. Signal 500, or $X_k$, may be written as $X_k = R_k + jI_k$. The values for $R_k$ and $I_k$ can take the values $\{+/-d/2, +/-3d/2 \ldots +/-(M-1)d/2\}$. The real and the imaginary components determine the amplitude and phase of the signal. Where $A = \text{sqrt}(R_k^2 + I_k^2)$ and $\phi = \tan^{-1}(I_k/R_k)$.

When a receiver receives signal 500 some noise may be included with the signal. The constellation for an uncoded signal is segmented according to the possible constellation points for purposes of decoding. For example, the shaded region 506 is a constellation region corresponding to the constellation point 504. If the receiver receives any signal falling within region 506 the receiver decodes the signal as carrying the value of constellation point 504.

The illustrated constellation is arranged in a square constellation. However, other forms of constellation packing may be used in accordance with the present inventions. By way of example, hexagonally packed constellations, rectangular constellations, circular constellations, cross-constellations or any other suitable constellation configuration may be used. The following discussion of one embodiment of the present inventions focuses on a square packed constellation, but any of the aforementioned constellation types may be utilized with slight modifications. The dimensions of alternate configurations of constellations may have different dimensions than the illustrated square packed embodiment. For example, a rectangular constellation would have two values of M, $M_i$ and $M_q$.

Figure 17A:
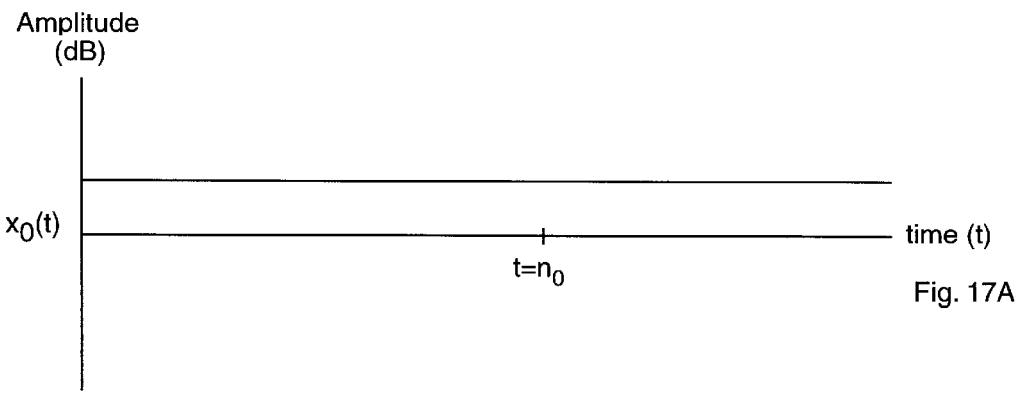
FIG. 17A illustrates a continuous time signal $x_0(t)$ in accordance with an embodiment of the present inventions.
Figure 17B:
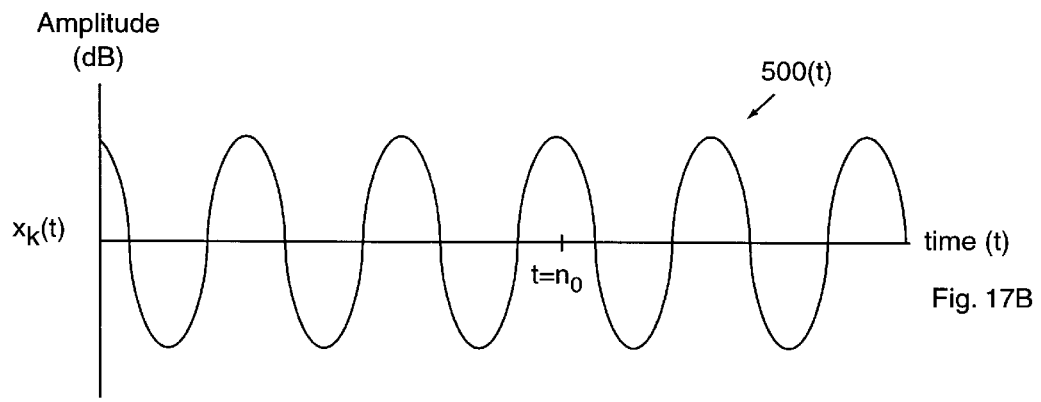
FIG. 17B illustrates a continuous time signal $x_k(t)$ 500(t), which corresponds to signal $X_k$ 500, in accordance with an embodiment of the present inventions.
Figure 17C:
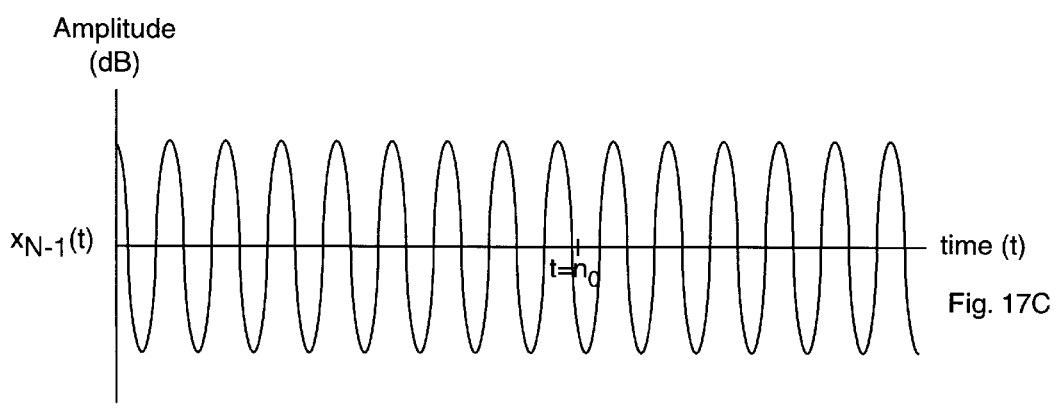
FIG. 17C illustrates a continuous time signal $x_{N-1}(t)$ in accordance with an embodiment of the present inventions.
Figure 17D:
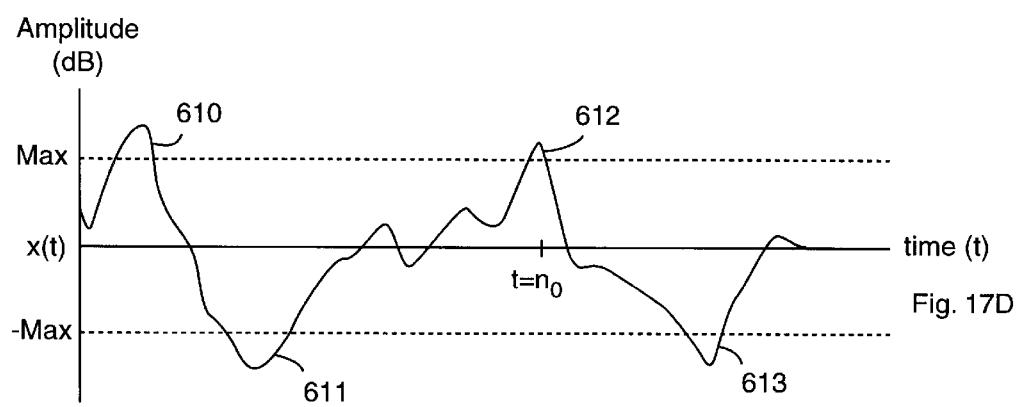
FIG. 17D illustrates a combined continuous time signal x(t) in accordance with an embodiment of the present inventions.

A vector X is composed of QAM constellation values, $X=[X_0 \ldots X_{N-1}]$. The corresponding time sequence x=IFFT $(X)=[x_0 \ldots x_{N-1}]$. Referring now to FIGS. 17A–17D, the continuous time function x(t) is the sum of all the continuous time functions $x_0(t)$ through $x_{N-1}(t)$. FIG. 17A illustrates a continuous time signal $x_0(t)$, which corresponds to signal $X_0$; FIG. 17B illustrates continuous time signal $x_k(t)$ 500(t), which corresponds to signal $X_k$ 500; and FIG. 17C illustrates continuous time signal $X_{N-1}(t)$, which corresponds to signal $X_{N-1}$. FIG. 17D illustrates the combined continuous time signal x(t). Again, the signals are represented in the continuous time domain for ease of illustration. The same principles of the present inventions apply to operations in the discrete time domain.

The signal x(t) is the sum of the component time signals $x_0(t)$ through $x_{N-1}(t)$. x(t) includes a number of peaks 610–613 that exceed the maximum values allowed. By observing the component time signals $x_0(t)$ through $x_{N-1}(t)$ it can be determined which of the component time signals contribute to the peaks. After determining which of the component time signals contributes to the peak, those component time signals can be modified appropriately.

In the illustrated embodiment the component time signal that contributes most to the peak is corrected. In an alternate embodiment it may be easier to modify several time component signals that individually do not contribute as much, but as a whole significantly contributes to a peak. Those time component signals may be modified rather than the largest contributing component time signal. For example, a time component signal may contribute to more than one peak. If the separation of the peaks of the time component signal are aligned a single sinusoid added to that time component signal may be able to cancel more than one of the peaks of the time component signal, thereby reducing more than one peak of the entire symbol.

Other algorithms and methods for reducing one or more peaks by modifying the component information signals of the symbol may be applied in accordance with the present inventions.

In some of the embodiments of the present inventions discussed above, peak reduction signals were added to peak reduction frequencies. The peak reduction frequencies are generally reserved for carrying peak reduction signals. In the illustrated embodiment, a peak reduction signal is added to the component information. Thus, there is no reduction in the bandwidth of the communication system.

While the illustrated embodiment depicts a basis function being added to a component time information signal, it will be appreciated that the frequency domain equivalent of the basis function may be added to the component frequency information signal. The present inventions may be implemented in any suitable domain of the communication scheme.

In one embodiment the peak reduction signal is a sinusoid, which is the basis function of the exemplary communication system. A sinusoid is applied to the component time signal that contributes most to a particular peak in order to cancel the effects of that component time signal and produce a modified information signal. The addition of a sinusoidal peak reduction signal is easily mapped on an expanded constellation. The receiver can also easily decode the modified information signal by accounting for the addition of the sinusoid, as discussed further below.

For example, referring back to FIGS. 17A–17D, it may be desired to reduce peak 612 of time signal x(t) of FIG. 17D. Reviewing the signals $x_0(t)$ through $x_{N-1}(t)$, it may be determined that component time signal $x_k(t)$ (500(t)) contributes most to peak 612 at time $n_0$. A peak reduction signal is then applied to component time signal $x_k(t)$ in order to reduce its contribution to peak 612.

The peak reduction signal applied to component time signal $x_k(t)$ is desirably designed to be easily added to the information signal and easily decoded by the receiver. This may be achieved by duplicating the original constellation. The duplicated constellations are spaced around the original constellation at certain intervals.

Figure 18:
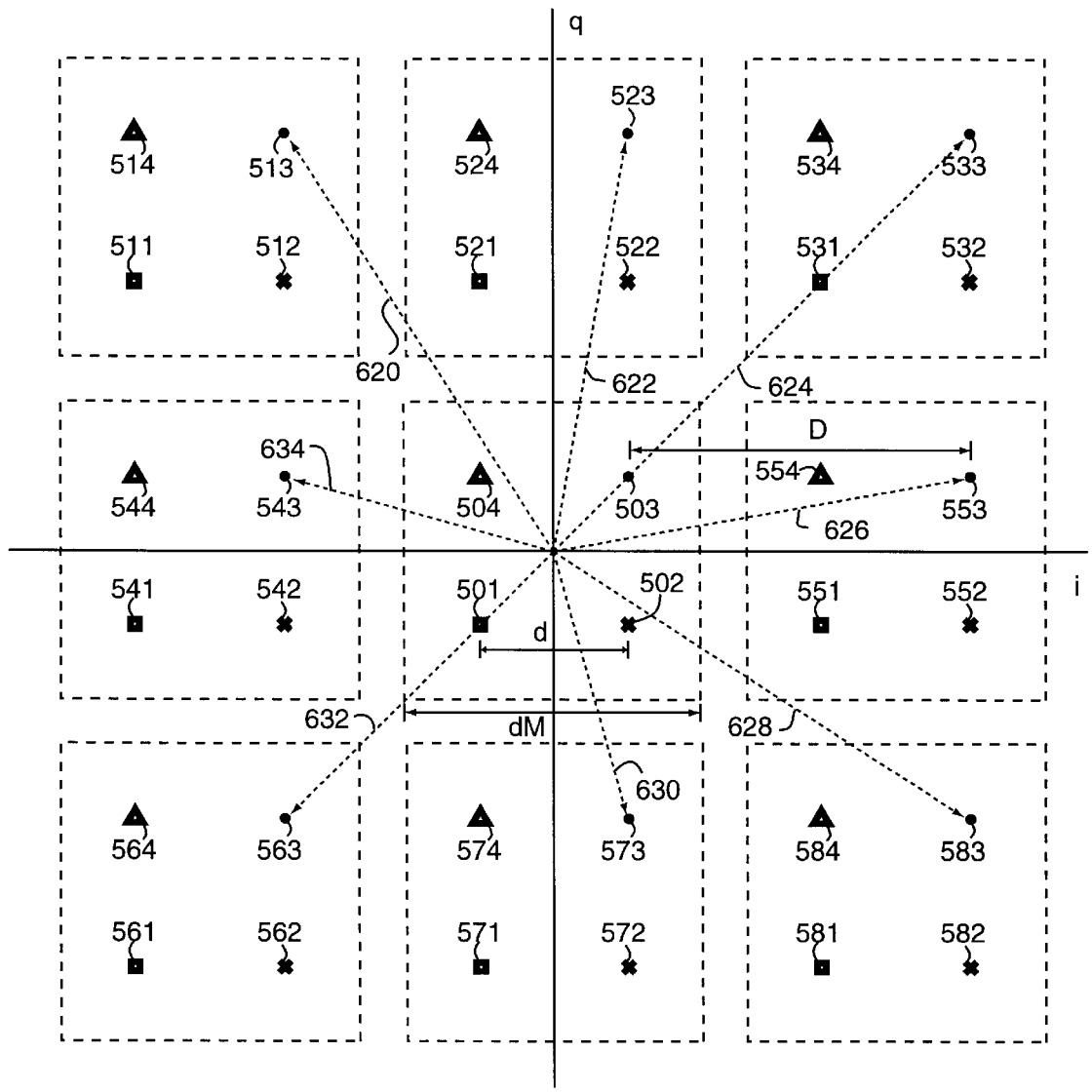
FIG. 18 illustrates an original constellation with duplicate constellations in accordance with an embodiment of the present inventions.

FIG. 18 illustrates an original constellation with duplicate constellations in accordance with an embodiment of the present inventions. The constellation points 501–504 of the original signal 500, or $X_k$, remain in their original position. In addition, constellation points 511–514, 521–524, 531–534, 541–544, 551–554, 561–564, 571–574 and 581–584 are added around the original constellation. The additional constellation points map directly to the original constellation points. For example, constellations points 511, 521, 531, 541, 551, 561, 571 and 581 map to the original constellation point 501, and represent the same piece of information.

The duplicate constellation points are spaced at multiples of a distance D from the original constellation point along the real or imaginary axes. For example, the distance between original constellation point 503 and duplicate constellation point 553 is D along the real axis (i). The distance between original constellation point 503 and duplicate constellation point 533 is the magnitude of the vector (D+jD), which is equal to sqrt(2)·D.

Thus, if the original signal $X_k$ 500, pointed to original constellation point 503, a modified signal, $\hat{X}_k$ is created by adding a vector composed of orthogonal vectors of magnitude D along the axes. That is, $\hat{X}_k = X_k + (P_k D + j q_k D)$. $p_k$ and $q_k$ are integers which determine which of the duplicate constellations is being used. In the illustrated embodiment $p_k$ and $q_k$ can take the values of 0 or +/−1. If further rings of duplicate constellations are used the range of $p_k$ and $q_k$ would be accordingly larger. The values of $p_k$ and $q_k$ determine a number of potential modified signals, $\hat{X}_k$, 620, 622, 624, 626, 628, 630, 632 and 634.

When different constellations are used the values for D may be different for each dimension (e.g., a rectangular constellation would have dimensions $D_i$ and $D_q$). Additionally, D varies with each component information signal since the constellations of each component information signal may be different.

Referring back to FIG. 16, signal $X_k$ 500 carried information indicating that the constellation point 503 is selected. The corresponding component time signal $x_k(t)$ (500(t) of FIG. 17B) also showed that $X_k$ contributed most to peak 612 of FIG. 17D at time=$n_0$. In order to reduce peak 612 $x_k(t)$ is modified by modifying $X_k$.

The values of p and q are chosen to define a sinusoid that is added to the original signal $X_k$ 500 that reduces the magnitude of $x_k(t)$ at $n_0$. In one embodiment, all the potential modified signals are compared to the original signal to determine which of the modified signals, $\hat{X}_k$, 620, 622, 624, 626, 628, 630, 632 and 634 provides the best modification of the original signal $X_k$. This approach is convenient in embodiments where the number of duplicate constellations is low.

Figure 19A:
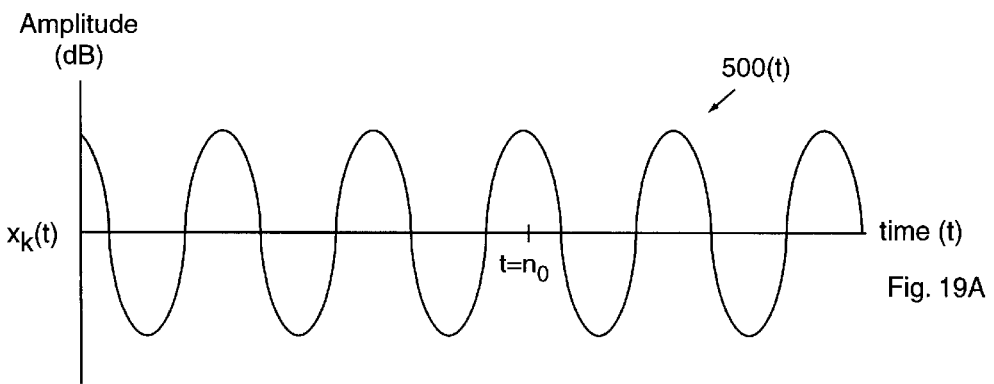
FIG. 19A illustrates an original continuous component time signal $x_k(t)$ 500(t) in accordance with an embodiment of the present inventions.
Figure 19B:
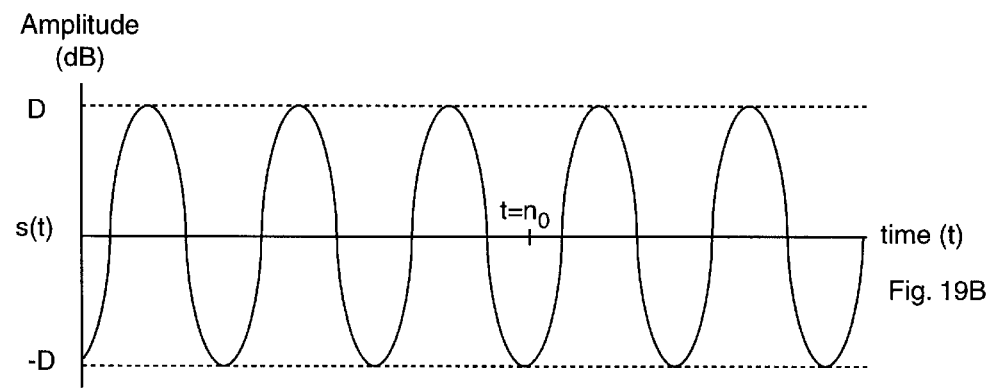
FIG. 19B illustrates a sinusoid s(t) which would reduce the peak of $x_k(t)$ at $t=n_0$ in accordance with an embodiment of the present inventions.

Referring to FIGS. 18 and 19A through 19D, one iteration of modifying a signal is depicted according to one embodiment. FIG. 19A illustrates the original continuous component time signal $x_k(t)$ 500(t). $x_k(t)$ 500(t) peaks at time $t=n_0$. FIG. 19B illustrates a sinusoid s(t) which would reduce the peak of $x_k(t)$ at $t=n_0$.

In the illustrated example, sinusoid s(t) of FIG. 19B corresponds to modifying $X_k$ in the frequency domain by a distance D in the real domain. Referring back to FIG. 18, modified signal $\hat{X}_k$ is chosen at duplicate constellation point 553. Thus, $\hat{X}_k=X_k+(1)D+j(0)D$, or $p_k=1$ and $q_k=0$. If the original values for the real and imaginary components is such that $X_k=R_k+jI_k=1+j$, then $\hat{X}_k=(1+j)+D+j(0)=(1+D)+j$.

Figure 19C:
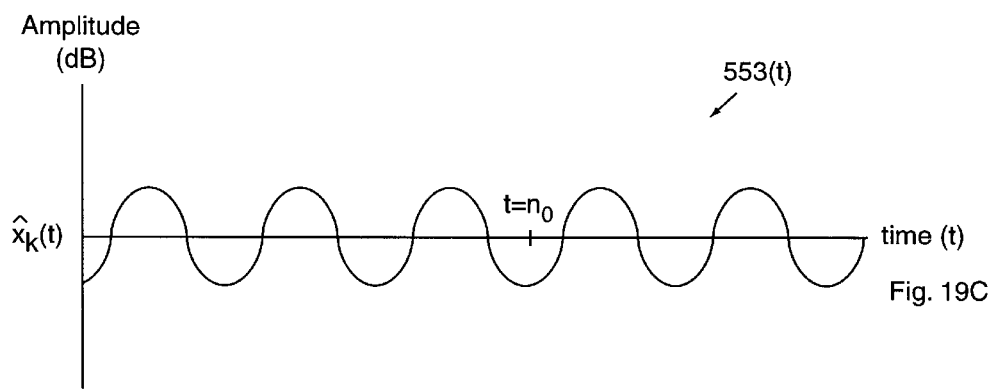
FIG. 19C illustrates a modified continuous time signal $\hat{x}_k(t)$, which corresponds to modified signal $\hat{X}_k$, in accordance with an embodiment of the present inventions.

FIG. 19C illustrates a modified continuous time signal $\hat{x}_k(t)$, which corresponds to modified signal $\hat{X}_k$. The addition of sinusoid s(t) to $x_k(t)$ to reduce the peak of $x_k(t)$ produces modified time signal $\hat{x}_k(t)$. The value of $x_k(t)$ is reduced at time no, however, other peaks may appear in $\hat{x}_k(t)$. These additional peaks may or may not affect the peaks of the overall modified time signal.

Figure 19D:
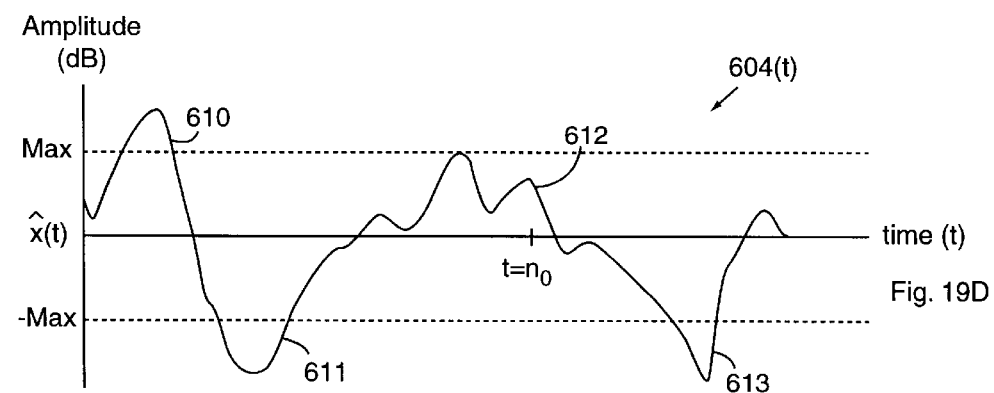
FIG. 19D illustrates the modified time signal $\hat{x}(t)$, which is the sum of all the component time signals $x_0(t)$ through $x_{N-1}(t)$, including modified time signal $\hat{x}_k(t)$ in accordance with an embodiment of the present inventions.

FIG. 19D illustrates the modified time signal $\hat{x}(t)$, which is the sum of all the component time signals $x_0(t)$ through $x_{N-1}(t)$, including modified time signal $\hat{x}_k(t)$. Peak 612 of $\hat{x}(t)$ is decreased due to the modification of $x_k(t)$ to $\hat{x}_k(t)$. However, the other peaks 610, 611 and 613 may be inadvertently increased. The process of modifying a component time signal is repeated in the illustrated embodiment. In the next iteration a new component may be selected that contributes to another peak that is to be reduced.

In another embodiment, where the number of duplicate constellations is great, the best value for $\hat{X}_k$ may be computed. The computation of the appropriate sinusoid to be added to a component signal also applies to the aforementioned embodiment.

The discrete time signal representation of a real baseband discrete multi-tone symbol may be represented as:

$$x[n] = \frac{2}{\sqrt{N}} \sum_{k=1}^{N/2-1} g_k [R_k \cos(2\pi kn/N) - I_k \sin(2\pi kn/N)] + g_0 \frac{R_0 + I_0 \cos(n\pi)}{\sqrt{N}}, n = 0, ..., N-1$$

where $X_k = R_k + I_k$, and $g_k$ is the scaling factor for frequency k.

Scanning the values of the symbol x[n] determines at which values of n peaks exist. For example, a peak may be found at $n=n_0$. The value for $x[n_0]$ is:

$$x[n_0] =$$

-continued $$\frac{2}{\sqrt{N}} \sum_{k=1}^{N/2-1} g_k [R_k \cos(2\pi kn_0/N) - I_k \sin(2\pi kn_0/N)] + g_0 \frac{R_0 + I_0 \cos(n_0 \pi)}{\sqrt{N}}$$

Assuming that the peak at no is a positive peak, the components of $x[n_0]$ may be scanned to determine which of the components contributes the most to the peak. A positive contributor may be found at frequency $k_0$. If all the components, $X_k$, are 16 QAM, and the values for $X_{k_0}=3+j$, or $R_{k_0}=3$ and $I_{k_0}=1$, and the value for $\cos(2\pi kn_0/N)$ is positive then the real part of the component $X_{k_0}$ may be reduced by D. The new peak $\hat{x}[n_0]$ is:

$$\hat{x}[n_0] < x[n_0] - g_{k_0} \frac{2lD}{\sqrt{N}} \leq x[n_0] - g_{k_0} \frac{4lM}{\sqrt{N}}$$

where l is a threshold factor, $0 \leq l \leq 1$. The term l limits the use of sinusoids that are too small at the peak location to be effective in canceling out a peak of component information time signal. Values of l ranging from about 0.6 to about 0.8 have been found to provide good results. The middle term of the inequality corresponds to the general case where D=dM. The right most term is the specific case where D=dM.

The new transmit symbol $\hat{x}[n]$ can be computed without repeating the IFFT since the new transmit symbol contains only one modified tone.

$$\hat{x}[n] = x[n] + \frac{2}{\sqrt{N}}(g_{k_0} D_{k_0})\cos(2\pi k_0 n/N), n = 0, ..., N-1$$

Thus, the real portion of $X_{k_0}$ is reduced. Should the imaginary portion of $X_{k_0}$ also contribute to the peak a similar algorithm may be performed on the sin( ) portion of that component. Similarly, $X_k$ may be modified at other points in time to correct the same or other peaks. Further, other component information signals of X, may be similarly modified.

More generically, the modified symbol with one tone modified may be written as:

$$\hat{x}[n] = x[n] + \frac{2}{\sqrt{N}} \sum_{k_0} (g_{k_0} p_{k_0} D_{k_0}) \cos(2\pi k_0 n/N) -$$

$$\frac{2}{\sqrt{N}} \sum_{k_0} (g_{k_0} q_{k_0} D_{k_0}) \sin(2\pi k_0 n/N), n = 0, ..., N-1$$

$p_{k_0}$ and $q_{k_0}$ are chosen to provide the best peak reduction. The equation is expanded as more peaks are reduced by modifying different information signals at different frequencies. The range of p and q varies with the number of duplicate constellations that are used. Varying the values of $p_{k_0}$ and $q_{k_0}$ aligns the phase of the sinusoid such that the sinusoid effectively cancels out one or more peaks at the given points in time. Again, in an alternate embodiment, if two peaks are appropriately spaced a single sinusoid (or basis function) may cancel more than one peak at a single time.

Independent of which method of determining the values for p and q the method for decoding the modified symbols is of low complexity. The receiver performs a modulo operation based upon the values of M and D. The bit rates and modulation scheme (and, therefore, the constellation size) of each frequency is typically transmitted to the receiver during initialization. Information about duplicate constellations may also be transmitted to the receiver at the same time.

Once the receiver knows the values of D and M for each frequency, the receiver may readily decode the duplicate constellation points and map them to the original constellation points. In the case where D≧dM, the mapping algorithm is:

$$X_k = \text{mod}_{[-dM/2, dM/2], D}\{\hat{X}_k\}$$

When D=dM, the algorithm reduces to:

$$X_k = \text{mod}_D\{\hat{X}_k\}$$

Figure 20:
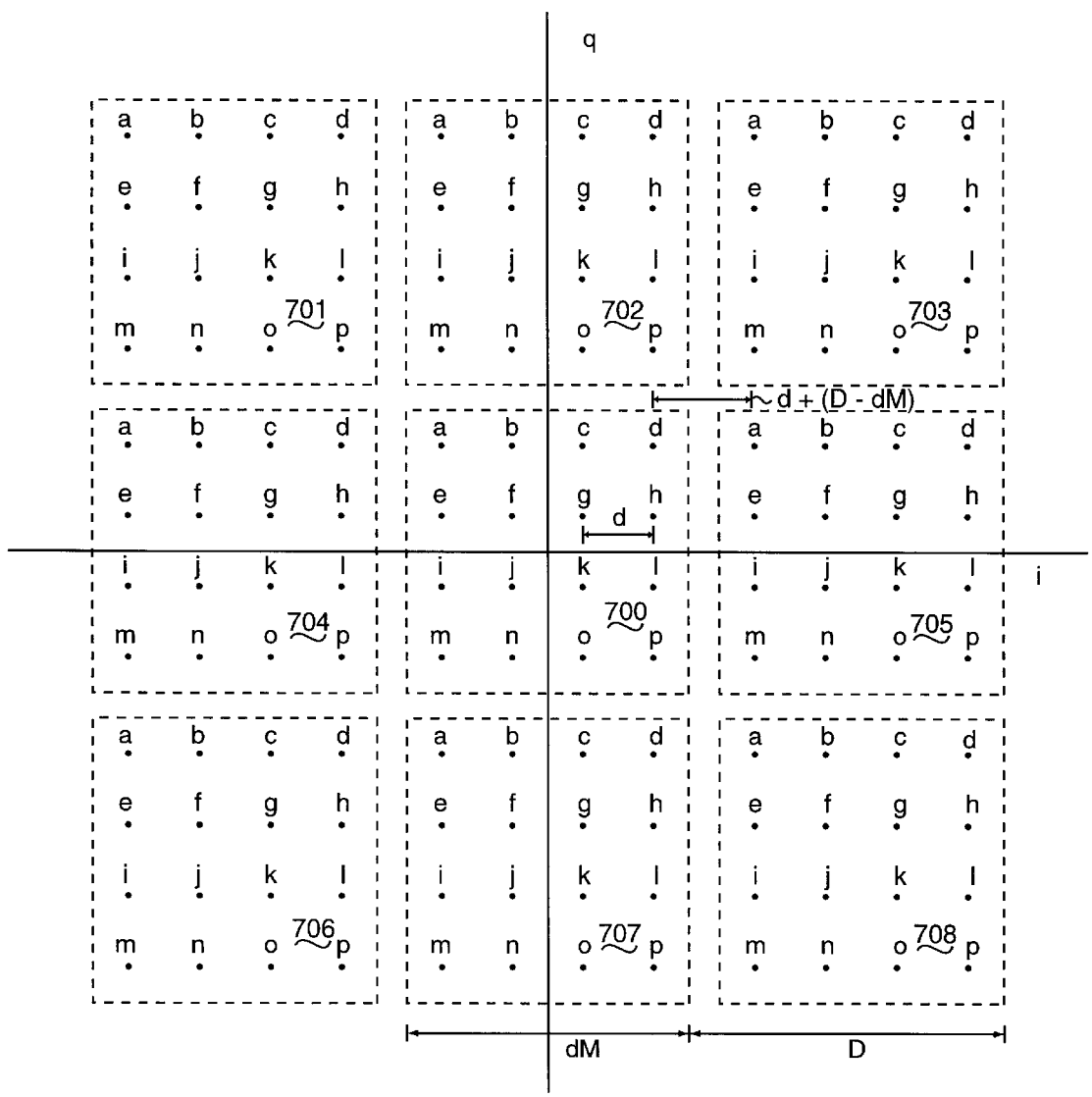
FIG. 20 is a constellation with duplicate constellations of a 16 QAM signal in accordance with one embodiment of the present inventions.

In some embodiments it may be preferred to have D≧dM, referring now to FIG. 20. FIG. 20 is a constellation with duplicate constellations of a 16 QAM signal in accordance with one embodiment of the present inventions. The constellation map includes an original constellation 700 with constellation points 700a–700p, and duplicate constellations 701–708 with duplicate constellation points a–p.

If D=dM then the duplicate constellations 701–708 directly border original constellation 700. As discussed, the nearest neighbors of each constellation point in the original constellation 700 are separated by a distance d. When D=dM, neighboring duplicate constellation points also become nearest neighbors to the outer ring of original constellation points.

For example, when D>dM the nearest neighbors for original constellation point 700h are neighboring original constellation points 700(d, g and l), separated by a distance d. The nearest duplicate constellation point to original constellation point 700h is 705e. The distance between points 700h and 705e is d+(D-dM). When D=dM, the distance between points 700h and 705e reduces to d, and 705e becomes a nearest neighbor.

Having duplicate constellation point 705e as a nearest neighbor presents even a greater problem than just having another nearest neighbor. Usually original constellation point 700h is only one bit different from original constellation points 700d, g and l. Typically, error correction coding may be implemented to correct the incorrect decoding of original constellation point 700h if one of constellation points 700d, g or l is received since there is only one bit of error. When duplicate constellation point 705e is received it is mapped to original constellation point 700e, which may be more than one bit different from original constellation point 700h. Error correcting codes may not be able to compensate for the difference in that case. The problem increases as the size of the constellation increases.

In an alternate embodiment, the problem may be alleviated by increasing the complexity of the receiver. If the receiver has knowledge of the duplicate constellations, i.e., through the initialization process, and the receiver performs error correction decoding before mapping the received signal to the original constellation, the problem is significantly avoided. However, this adds a bit more complexity to the receiver since it has to perform more than a simple modulo operation on the data. Depending upon the channel it may be desirable to have D=dM When duplicate constellation point 705e is separated from point 700h only by the distance d the probability of incorrectly decoding $\hat{X}_k$ increases unless the receiver is made more complex. The bit error rate, therefore, increases when D=dM. For large enough D>dM the bit error rate does not suffer with the addition of duplicate constellations, however, the power of the transmitted symbol may be increased.

Thus, a potential concern with the illustrated embodiment is that the overall power of the transmitted symbol may be inadvertently increased by adding peak reduction signals to information signals. Through various methods an increase in the overall power of the transmitted symbol may be minimized.

One method is to minimize the value of D, or the separation between the original constellation and the duplicate constellation. If power considerations are greater than bit error rate considerations then D may be minimized to dM. Otherwise, a value of D may be chosen to be greater than dM without significantly increasing the overall power of the transmitted discrete multi-tone symbol.

In such cases, other methods may be employed to minimize any increase in transmit power. One method is to choose those signals $X_k$ that have values that are outermost original constellation points in the constellation. Referring again to FIG. 20, $X_k$ is chosen for modification if it's value is 700(a, b, c, d, e, h, i, l, m, n, o or p). $X_k$ is not chosen if its value is 700(f, g, j or k). By choosing to add increments of D to the outer original constellation points the amount of added energy is less than the energy required to modify $X_k$ if it's value is one of the inner original constellation points.

In addition to choosing outer original constellation points, the method in which $X_k$ is modified may also be designed to minimize an increase in transmit power. If $X_k$ has a value of original constellation point 700d the value for $X_k$ is $R_k$ =3 and $I_k$=3. Duplicate constellation points 701d–708d may be chosen to modify $X_k$. But, some of the duplicate constellation points increases the power of the component to a lesser extent than others. For example, duplicate constellation points 701d, 702d, 703d, 705d and 708d require significantly more power than original constellation point 700d. Duplicate constellation points 704d, 706d and 707d require only marginally more power than original constellation point 700d. Therefore, if power is a consideration, original constellation point 700d is limited to being mapped to duplicate constellation points 704d, 706d and 707d.

Generally, values for p and q may be limited to the following constraints to minimize the transmitter power.

$$\text{sign}(p) = -\text{sign}(R_k); \text{ and}$$

$$\text{sign}(q) = -\text{sign}(I_k)$$

This relationship can be used for any of the original constellation points to minimize the increase in transmit power. Use of the algorithm on the original inner constellation points may only provide minimal savings in power. But, if applied to all the modified component signals the combined savings may be significant. Also, the savings increases with the increase in size of the original constellation.

Figure 21:
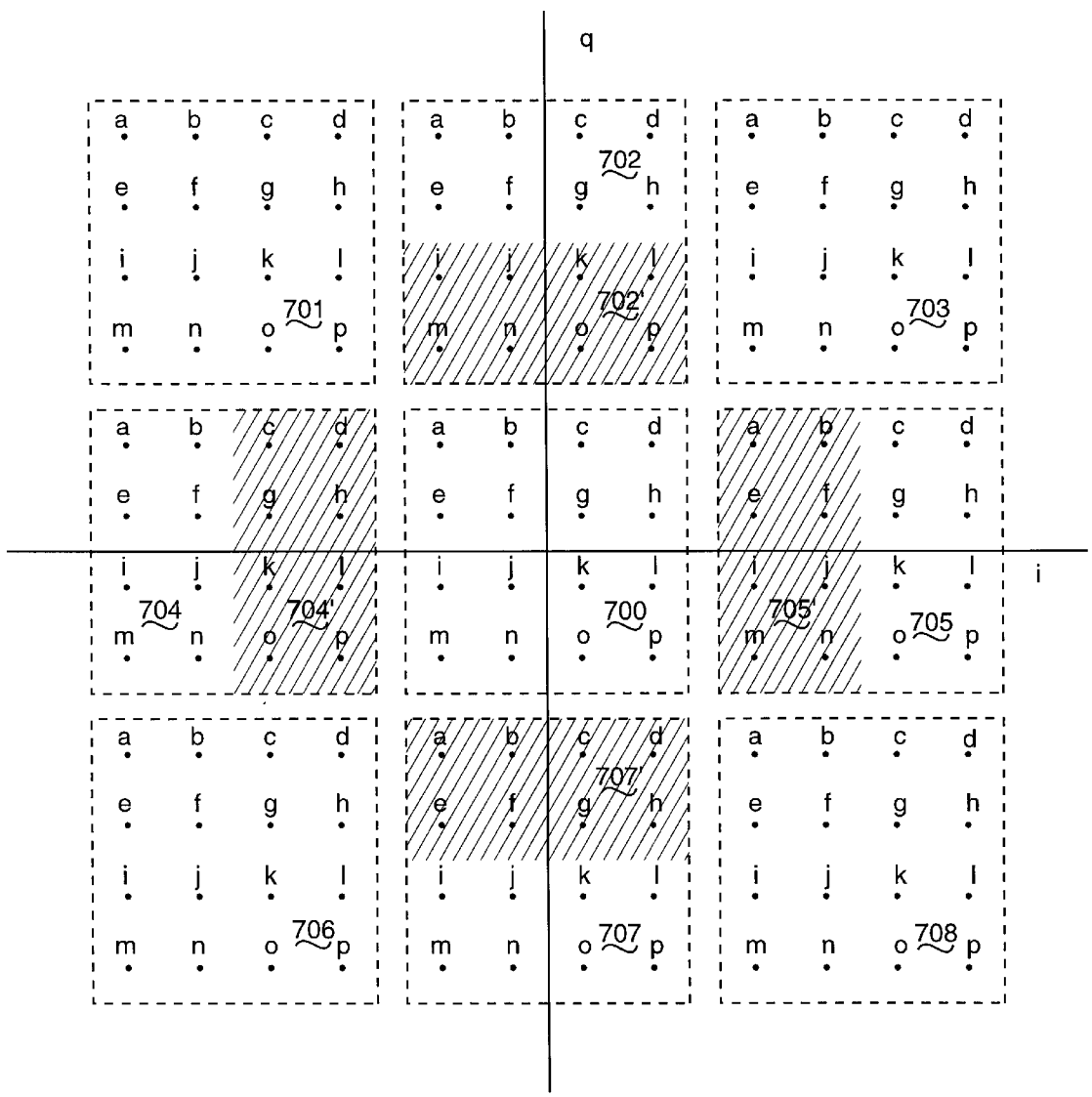
FIG. 21 illustrates a constellation map in accordance with an embodiment of the present inventions.

In another method only partial duplicate constellations may be employed, referring now to FIG. 21. FIG. 21 illustrates a constellation map in accordance with an embodiment of the present inventions. The constellation map depicts original constellation 700 and duplicate constellations 701–708 of FIG. 20. However, duplicate constellations 702, 704, 705 and 707 include partial duplicate constellations 702', 704', 705' and 707'.

Partial duplicate constellations 702', 704', 705' and 707' represent alternative duplicate constellations. Rather than mapping the original constellation points to all of the duplicate constellation points, mapping may be confined to partial duplicate constellations 702', 704', 705' and 707'. The use of partial duplicate constellation points reduces the number of duplicate constellation points, and also reduces the maximum amount of power increased involved in the modification of $X_k$.

Alternately, partial duplicate constellations 702', 704', 705' and 707' may be weighted during the determination of the values of p and q. In that embodiment, all of the duplicate constellation points are used, but preference is given to the constellation points that lie within partial duplicate constellations 702', 704', 705' and 707'. Further, the partial duplicate constellations may take any shape neighboring the original constellation 700. By way of example, the constellation points 701(*k, l, o* and *p*) may form another partial duplicate constellation, or constellation points 701(*l, o* and *p*) may be used, along with corresponding constellation points in the other duplicate constellation.

It is appreciated that any type of constellation mapping may be utilized within the scope of the present inventions. For example, the duplicate constellation need not be configured identically to the original constellation. It may be preferred to locate duplicate constellation points near their original constellation point counterpart. In FIG. 21 constellation 704' may include the points 704(*a, b, e, f, i, j, m* and *n*) rather than the illustrated points. Thus, the duplicate constellation points are closer to their original constellation point counterparts in original constellation 700.

In another example, the inner points (e.g., 700*f, g, j* or *k*) of the original constellation are not modified. However, if the information signal is one of the outer points (e.g., 700 *a, b, c, d, e, h, i, l, m, n, o* or *p*) the basis function may be of magnitude D/2 rather than D. This requires less energy to be added to the signal while still providing adequate mapping of the original constellation point. Thus, there are a myriad number of ways to map the original constellation. Any one method may be used depending upon the needs of the communication system.

The illustrated embodiments of FIGS. 11–13 may utilize modified signals as discussed above. The kernel applicator 206 of FIG. 11 would apply a basis kernel rather than a kernel based upon peak reduction frequencies that do not carry any information signals. Any suitable linear combinations of the basis kernel may be used to modify the information signal. The basis kernel is added to the information signal of frequencies that add to one or more peaks of a symbol, Similarly, kernel engine 222 of FIG. 12 applies a basis kernel (or linear combinations thereof), in this case a sinusoidal kernel, to a discrete time signal vector x provided by inverse fourier transformer 220. In addition to using a basis kernel or a kernel that is a linear combination of the basis function, appropriate kernels constructed from linear combinations of basis functions may be precomputed to be added to the signal for PAR reduction.

Decoder 306 of FIG. 13 decodes all the frequencies used in the multi-carrier communication system. Rather than decoding only frequencies that contain information signals and ignoring the peak reduction frequencies, all frequencies are utilized with the use of modified signals, Decoder 306 need only perform a modulo operation on those frequencies that carry a modified signal rather than an unmodified information signal.

Figure 22:
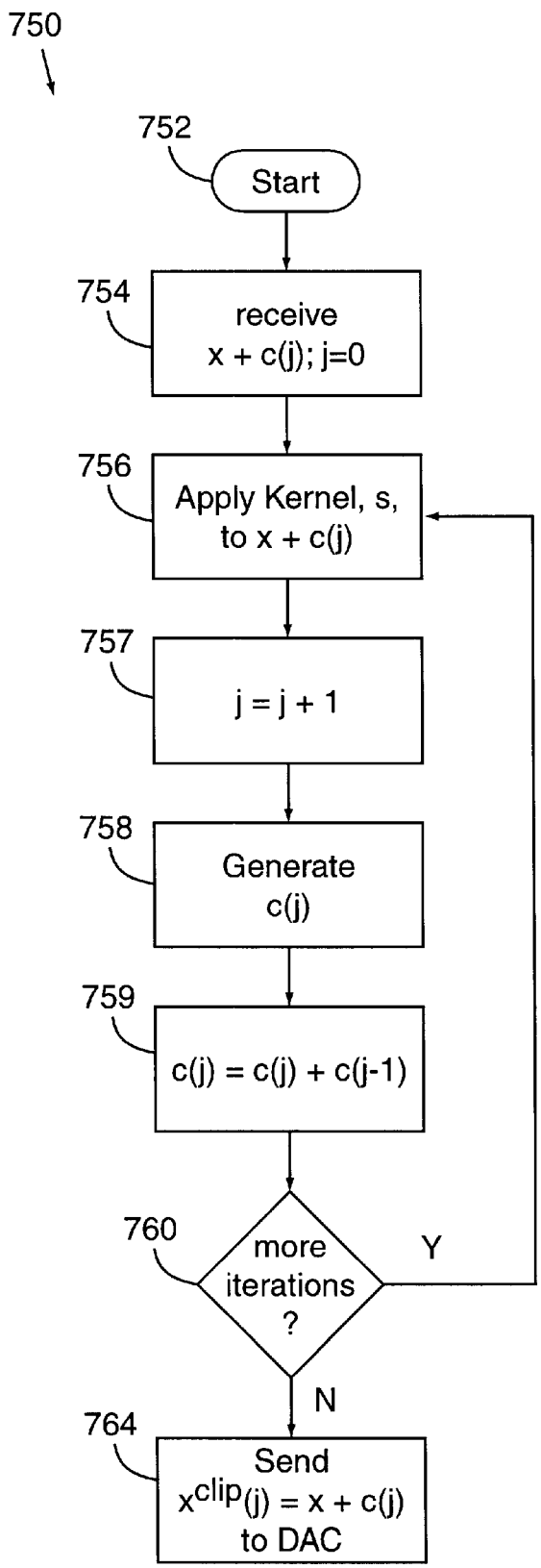
FIG. 22 illustrates a flow chart of the operation of the kernel engine of FIG. 12 in accordance with another embodiment of the present invention.

FIG. 22 illustrates a flow chart 750 of the operation of the kernel engine of FIG. 12 in accordance with another embodiment of the present invention. Initially, the bit rates of all the available frequencies are determined. The bit rates of the frequencies dictate the type of constellation used for each frequency. The number and location of duplicate constellations may be determined based upon power, bit error rate, peak values and locations, actual and desired peak to average power ratios or any other suitable considerations. The original constellations and the number of duplicate constellations may be sent to a receiver before transmission of actual signals. This initialization process requires little bandwidth and typically need not be performed more than periodically. The information may be as little as sending the values for D for each information signal to the receiver. Alternatively, D may be fixed to equal dM+c, where c is a constant that is known to the receiver. Thus, the receiver can derive D by knowing the dimensions of the original constellation.

In alternate embodiments, the values of D and constellations sizes and numbers may vary per tone, or even per symbol. In which case, further information may be sent to the receiver. While some bandwidth may be required, optimization of the usage of the channel and the reduction in the complexity of the receiver necessary to decode the symbol may make up for the difference.

Referring to FIG. 22 and FIG. 11, the flow chart 750 begins in block 752 and proceeds to block 754. In block 754 x is received from IFFT 220. Initially, IFFT 220 provides a peak reduction component, c(0), that is zeroed out.

In block 756 the kernel engine analyzes x+c(j) and applies one or more kernels to x+c(j) to reduce any peaks. In the instant embodiment the kernel is a sinusoid, or a sum of sinusoids. In the first pass $x^{clip}(j)=x+c(j)$; j=0.

The kernel engine may negate one, two, or as many peaks as desired in one iteration by adding one or more sinusoidal kernels. The number of sinusoidal kernels that are applied to x may be a significantly large number per iteration since adding a sinusoid to x is a simple operation. The number of sinusoidal kernels that are applied may be limited in order to verify that no new peaks have been created.

In block 757 the index j is incremented. Proceeding to block 758 the kernel engine generates the sinusoidal kernel values for c(j). In block 759 the new peak reduction components are accumulated by adding the previous peak reduction components; c(j)=c(j)+c(j−1).

The kernel engine determines whether more iterations are required in block 760 based upon the number and size of peaks remaining in the signal x+c(j). If no other iterations are required the current $x^{clip}(j)=x+c(j)$, is passed on to DAC 208 in block 764, where c(j) is the accumulated sum of all the iterations of applying the kernel. When further iterations are required, flow proceeds to back to block 756.

A single frequency may, thereby, carry an information signal component and a peak reduction signal component. The information signal typically contributes to one or more peaks in the discrete multi-tone symbol. The modification of the information signal to incorporate the peak reduction signal may be as simple as adding a basis function, such as a sinusoid, to the information signal. The modified signal contributes less to the peak than the original information signal component. A basis function dummy signal may be added to the information signal component by mapping the original constellation of the information signal to one of a number of duplicate constellations. The use of duplicate constellations also provides for simple decoding of the modified signal by the receiver. The receiver need only perform a simple modulo operation to decode the modified signal.

Alternate embodiments of the present inventions may be applied to a single carrier communication system. Particularly, the discussion of different embodiments of the present inventions in reference to FIGS. 14–22 may also be applied to single carrier communication systems. The peak to average power ratio of each symbol in time is reduced in relation to the other symbols preceding and succeeding the symbol. That is the overall transmitted signal is comprised of a number of symbols transmitted at different time intervals (rather than a number of different signals comprising a single symbol in the previously discussed embodiments).

The PAR of the overall signal may be reduced by individually modifying the symbols that make up the signal.

The embodiments discussed in reference to FIGS. 14–22 are readily applicable to reducing PAR on a per symbol basis and may be utilized to reduce the effect of a symbol on the PAR of that symbol and the overall signal. Buffering of preceding symbols may be required, but the operations necessary to reduce the PAR may still be performed in real time. In a single carrier embodiment, the basis function of the communication system becomes the filter impulse response.

In still another embodiment of the present inventions, the basis kernel may be precomputed to optimize its peak canceling effect. The computation of the basis kernel may be implemented in parallel to the discussion in reference to FIGS. 3–15. An optimized basis kernel may be implemented rather than an ordinary basis kernel.

In one embodiment, the optimized basis kernel may be optimized to cancel peaks at a particular instance of time. While the optimized basis kernel may not approach an impulse function in the way that the previously discussed embodiment does due to the constraint on the peak reduction signal that it should be a multiple of D along the real and imaginary axes, the optimized basis kernel may still be optimized to adequately reduce a single (or multiple) peaks. The optimized basis kernel may be comprised of a linear combination of basis functions precomputed for reducing a peak at a given point in time. For example, a precomputed optimized basis kernel for a symbol that has ten frequency components may have the values [0, 0, D, 0, (D–jD), 0, 0, jD, –D, (D+j2D)]. The optimized basis kernel only has peak reduction signal components in the 3rd, 5th, 8th, 9th and 10th frequencies rather than in all the frequencies. This begins to look similar to the previously described embodiment which uses dedicated dummy frequencies. However, in this case no bandwidth is lost.

The components of the optimized basis kernel in the time domain are, thereby, modified to coincide in time with the peaks. The constraint on the optimized basis kernel allows the component basis functions to act as vectors in the frequency domain that may be used to map the original constellation points to duplicate constellation points depending on the position of the peaks in the time domain. In this manner PAR is reduced without sacrificing bandwidth.

Merging the difference between the use of dedicated peak reduction frequencies and peak reduction signal components, a hybrid embodiment may be utilized to maximize peak reduction with minimal loss of bandwidth. Optimized basis kernels may be generated by allowing peak reduction signal components in only selected frequencies. Those frequencies may be dedicated to peak reduction and not carry an information signal, as in the previously discussed embodiment. However, the peak reduction frequencies vary per symbol. In this manner the best peak reduction frequencies may be used for each symbol, rather than having to use the same peak reduction frequencies for each symbol. One constraint is that the peak reduction signal component be larger than the size of the constellation established for those frequencies when they do carry information, e.g., $|Re(C_k)|>D/2$ and $|Im(C_k)|>D/2$.

The advantage of the hybrid embodiment is that the receiver need not be informed of the selection of the peak reduction frequencies. The receiver will decode all the frequencies of each symbol. Those frequencies that carry signals that are larger than the constellation designated for those frequencies are determined to be peak reduction frequencies for that particular symbol. The peak reduction signals in those frequencies may be disregarded and the remaining information signals may be properly decoded for that symbol. In the next symbol the receiver detects a new set of peak reduction frequencies.

In a pure dedicated peak reduction embodiment the peak reduction frequencies could not be changed on a per symbol basis without having to send side information to the receiver. This caused the selection of peak reduction frequencies to be performed in view of reducing the PAR for a wide variety of symbols. Thus, in some embodiments, the number of dedicated peak reduction frequencies could be as high as 10% of the total number of frequencies to ensure proper PAR reduction. In the hybrid embodiment a fewer number of peak reduction frequencies are required for each symbol since the peak reduction frequencies are optimally selected for each symbol. Also, no side information is required since the receiver is capable of automatically detecting the peak reduction frequencies. Thus, the amount of bandwidth lost is minimized with the same, if not better, reduction of the PAR.

While the discussion has focused on reducing the peak to average power ratio as measured at the transmitter, the present inventions apply equally to reducing the PAR as measured at the receiver. Especially if the characteristics of the channel are known then the transmitted symbols may be modified in order to reduce the PAR as measured at the receiver. This is useful for channels with long impulse responses where the PAR of a symbol increases as the symbol is transmitted to the receiver. By anticipating this increase in PAR the transmitted symbol may be appropriately modified prior to transmission.

Of course, side information may also be used to facilitate the reduction of the peak to average power ratios in a communication system. Side information may be sent to the receiver concerning the clipping of the symbol, duplicate constellations or any suitable type of information. The more information provided to the receiver, the easier it is for the receiver to decode the transmitted symbol and the easier it is to reduce the PAR at the transmitter. The side information may be sent to on a per symbol basis, e.g., if the PAR reduction scheme is based on a per symbol algorithm, or less frequently depending upon the PAR reduction scheme. While a focus of some of the embodiments of the present inventions is to reduce PAR without a significant loss of bandwidth, there are cases where reducing the PAR of a signal is preferable over the loss of bandwidth. In those cases alternate embodiments of the present inventions that utilize side information may be employed.

The present inventions apply to any type of communication systems utilizing single or multiple carriers. By way of example, the present inventions apply to Discrete Multi-Tone (DMT), Orthogonal Frequency Division Multiplexing (OFDM), Discrete Wavelet Multi-Tone (DWMT) communication systems, Vector Coding Modulation. The basis functions for such systems may include sinusoids, complex exponentials, singular vectors of channel matrix, wavelet filters or any other suitable basis function for a multi-carrier communication system. Alternate embodiments of the present inventions apply to single carrier communication systems, such as Carrier-less Amplitude Phase (CAPs), vestigial side band, amplitude modulation and the like. The basis functions for single carrier (or no carrier systems) are generally the delayed versions of the transmit pulse or transmit filter.

While these inventions have been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A transmitter configured to transmit a symbol in a communication system, wherein the transmitted symbol has a peak to average power ratio and is a function of a plurality of information signals each of which is based at least in part upon an associated information signal constellation that includes a plurality of information signal constellation points, the plurality of information signals including a modified signal, wherein the modified signal is based at least in part on one associated duplicate constellation, each duplicate constellation comprising at least one duplicate constellation point, wherein at least one of the plurality of information signal constellation points is mapped to at least one of the duplicate constellation points.

2. A transmitter as recited in claim 1 wherein the modified signal includes an information component and a peak reduction component, wherein the peak reduction component reduces the peak to average power ratio of the transmitted symbol.

3. A transmitter as recited in claim 1 wherein the mapping of at least one of the plurality of information signal constellation points to at least one of the duplicate constellation points is reversible by performing a modulo operation on the modified signal to obtain an unmodified signal.

4. A transmitter as recited in claim 1 wherein the mapping of at least one of the plurality of information signal constellation points to at least one of the duplicate constellation points minimizes any increase in the power used to transmit the symbol.

5. A transmitter as recited in claim 1 wherein the mapping of at least one of the plurality of information signal constellation points to at least one of the duplicate constellation points minimizes the bit error rate in the transmission of the symbol.

6. A transmitter that transmits a multi-carrier symbol in a multi-carrier communication system, wherein the transmitted multi-carrier symbol has a peak to average power ratio and is a function of a plurality of quadrature amplitude modulated information signals each of which is based at least in part upon an associated information signal constellation that includes a plurality of information signal constellation points, each of the plurality of information signals being centered at one of a plurality of frequencies, the plurality of information signals including a modified signal, the modified signal including an information component and a peak reduction component, wherein the peak reduction component of the modified signal is arranged to reduce the peak to average power ratio of the transmitted multi-carrier symbol;

wherein the modified signal has at least one associated duplicate constellation, each duplicate constellation including a plurality of duplicate constellation points, wherein the plurality of information signal constellation points of the information signal constellation associated with the modified signal are mapped to the plurality of duplicate constellations points in each duplicate constellation.

7. A transmitter as recited in claim 6, wherein the peak reduction component of the modified signal is a basis function of the multi-carrier communication system.

8. A transmitter as recited in claim 7, wherein the basis function is a sinusoid.

9. A transmitter as recited in claim 7, wherein the basis function is a wavelet.

10. A transmitter as recited in claim 7, wherein the basis function is a complex exponential.

11. A transmitter as recited in claim 6, wherein the peak reduction component of the modified signal is a basis function of the transmitter that is added to the information component such that the addition of the basis function to the information component maps the information component to a selected duplicate constellation point of the at least one duplicate constellation.

12. A transmitter configured to transmit a symbol in a communication system, the symbol having a peak to average power ratio and being a function of a plurality of information signals, the transmitter comprising:

a kernel applicator, wherein the kernel applicator reduces the peak to average power ratio of the symbol by modifying a selected information signal of the plurality of information signals, wherein each of the information signals is based at least in part upon an associated information signal constellation that includes a plurality of information signal constellation points;

wherein the modified information signal is based at least in part on at least one duplicate constellation, each duplicate constellation comprising at least one duplicate constellation point, wherein at least one information signal constellation point is mapped to at least one duplicate constellation point.

13. A transmitter for use in a multi-carrier communication system, the transmitter transmitting a multi-carrier symbol, the multi-carrier symbol having a peak to average power ratio and being a function of a plurality of information signals, the transmitter comprising:

a kernel applicator, wherein the kernel applicator reduces the peak to average power ratio of the multi-carrier symbol by modifying a selected information signal of the plurality of information signals, wherein the modified signal includes an information component and a peak reduction component, wherein each one of the plurality of information signals is a quadrature amplitude modulated signal that is based at least in part upon an associated information signal constellation that includes a plurality of information signal constellation points, wherein the modified signal includes one or more duplicate constellations, each of the one or more duplicate constellations including a plurality of duplicate constellation points, wherein the plurality of information signal constellation points of the associated information signal constellation are mapped to the plurality of duplicate constellation points of the one or more duplicate constellations.

14. A transmitter as recited in claim 13, the transmitter further comprising an encoder, wherein the encoder encodes a first set of data into a plurality of sets of data; and a modulator, coupled to the encoder, that receives the plurality of sets of data and modulates each set of data of the plurality of sets of data to produce the plurality of information signals, which are combined, the modulator also coupled to the kernel applicator, the modulator providing the plurality of information signals to the kernel applicator.

15. A transmitter as recited in claim 14, wherein the kernel applicator includes:

a transformer, coupled to the modulator, the transformer performing a transform on the plurality of information signals producing a transformed signal; and a kernel engine, coupled to the transformer, wherein the kernel engine analyzes the transformed signal and, when the kernel engine detects a peak in the transformed signal, the kernel engine applies a kernel to the detected peak of the transformed signal, further wherein the kernel is a basis function of the transmitter, the basis function being applied to the information component of the modified signal, whereby the basis function is the peak reduction component of the modified signal.

16. A transmitter as recited in claim 15, wherein the transform is an inverse Fourier transform.

17. A transmitter as recited in claim 15, wherein the transform is a discrete wavelet transform.

18. A transmitter as recited in claim 15, wherein the basis function is a sinusoid.

19. A transmitter as recited in claim 15, wherein the basis function is a wavelet.

20. A transmitter as recited in claim 15, wherein the basis function is a complex exponential.

21. A transmitter as recited in claim 14, wherein the kernel applicator includes:
a transformer, coupled to the modulator, the transformer performing a transform on the plurality of information signals producing a transformed signal; and
a kernel engine, coupled to the transformer, wherein the kernel engine analyzes the transformed signal and, when the kernel engine detects two or more peaks in the transformed signal, the kernel engine applies a kernel to the two or more detected peaks of the transformed signal, wherein the kernel is a basis function of the transmitter, the basis function being applied to the information component of the modified signal, whereby the basis function is the peak reduction component of the modified signal.

22. A transmitter as recited in claim 13, wherein the peak reduction component of the modified signal is a basis function of the transmitter that is added to the information component such that the addition of the basis function to the information component maps the information component to a selected duplicate constellation point of the one or more duplicate constellations.

23. A transmitter as recited in claim 22, wherein the modified signal of the transmitted multi-carrier symbol is mapped by a receiver from the selected duplicate constellation point of the modified signal to the associated information signal constellation.

24. A transmitter as recited in claim 23, wherein the receiver maps the modified signal from the selected duplicate constellation point of the modified signal to the associated information signal constellation by performing a modulo operation on the modified signal to obtain the information component of the modified signal.

25. A transmitter as recited in claim 13, wherein the kernel applicator retains information about the reduction of the peak to average power ratio of the multi-carrier symbol such that the transmitter also transmits the information to a receiver to facilitate decoding of the transmitted multi-carrier symbol.

26. A transmitter as recited in claim 13, wherein the kernel applicator reduces the peak to average power ratio of the multi-carrier symbol as measured at the transmitter.

27. A transmitter as recited in claim 13, wherein the kernel applicator reduces the peak to average power ratio of the multi-carrier symbol as measured at a receiver that receives the transmitted multi-carrier symbol.

28. A transmitter as recited in claim 27, wherein the transmitter transmits the multi-carrier symbol to the receiver through a channel such that the kernel applicator takes into account a characteristic of the channel to reduce the peak to average power ratio of the multi-carrier symbol as measured at the receiver.

29. A transmitter as recited in claim 13, wherein each of the plurality of information signals are centered at each of a plurality of frequencies, wherein a selected frequency of the plurality of frequencies is selected to carry the modified signal.

30. A transmitter as recited in claim 29, wherein the selected frequency is selected from the plurality of frequencies to facilitate the reduction of the peak to average power ratio of the multi-carrier symbol.

31. A communication system for transmitting a symbol having a peak to average power ratio and being a function of a plurality of information signals, the communication system comprising;
a symbol transmitter comprising:
a kernel applicator, wherein the kernel applicator reduces the peak to average power ratio of the symbol by modifying a selected information signal of the plurality of information signals, wherein each of the information signals is based at least in part upon an associated information signal constellation that includes a plurality of information signal constellation points;
wherein the modified information signal is based at least in part on at least one duplicate constellation, each duplicate constellation comprising at least one duplicate constellation point, wherein at least one information signal constellation point is mapped to at least one duplicate constellation point.

32. A multi-carrier communication system for transmitting a multi-carrier symbol having a peak to average power ratio and being a function of a plurality of information signals, the multi-carrier communication system comprising;
a symbol transmitter comprising:
a kernel applicator, wherein the kernel applicator reduces the peak to average power ratio of the multi-carrier symbol by modifying a selected information signal of the plurality of information signals, wherein the modified information signal includes an information component and a peak reduction component;
wherein each one of the plurality of information signals is a quadrature amplitude modulated signal that is based at least in part upon an associated information signal constellation that includes a plurality of information signal constellation points;
wherein the modified information signal is based at least in part upon at least one duplicate constellation, each duplicate constellation including a plurality of duplicate constellation points, wherein the plurality of information signal constellation points of the associated information signal constellation are mapped to the plurality of duplicate constellation points of the one or more duplicate constellations.

33. A multi-carrier communication system as recited in claim 32, wherein the peak reduction component is a basis function of the multi-carrier communication system.

34. A multi-carrier communication system as recited in claim 32, wherein the transmitter further includes:
an encoder, wherein the encoder encodes a first set of data into a plurality of sets of data; and
a modulator, coupled to the encoder, that receives the plurality of sets of data and modulates each set of data of the plurality of sets of data to produce the plurality of information signals, which are combined, the modulator also coupled to the kernel applicator, the modulator providing the plurality of information signals to the kernel applicator.

35. A multi-carrier communication system as recited in claim 34, wherein the kernel applicator includes:
   a transformer, coupled to the modulator, the transformer performing a transform on the plurality of information signals producing a transformed signal; and
   a kernel engine, coupled to the transformer, wherein the kernel engine analyzes the transformed signal and, when the kernel engine detects a peak in the transformed signal, the kernel engine applies a kernel to the detected peak of the transformed signal, further wherein the kernel is a basis function of the transmitter, the basis function being applied to the information component of the modified signal, whereby the basis function is the peak reduction component of the modified signal.

36. A transmitter as recited in claim 35, wherein the transform is an inverse Fourier transform.

37. A transmitter as recited in claim 36, wherein the transform is a discrete wavelet transform.

38. A multi-carrier communication system as recited in claim 35, wherein the basis function is a sinusoid.

39. A multi-carrier communication system as recited in claim 35, wherein the basis function is a wavelet.

40. A multi-carrier communication system as recited in claim 35, wherein the basis function is a complex exponential.

41. A multi-carrier communication system as recited in claim 34, wherein the kernel applicator includes:
   a transformer, coupled to the modulator, the transformer performing a transform on the plurality of information signals producing a transformed signal; and
   a kernel engine, coupled to the transformer, wherein the kernel engine analyzes the transformed signal and, when the kernel engine detects two or more peaks in the transformed signal, the kernel engine applies a kernel to the two or more detected peaks of the transformed signal, wherein the kernel is a basis function of the transmitter, the basis function being applied to the information component of the modified signal, whereby the basis function is the peak reduction component of the modified signal.

42. A multi-carrier communication system as recited in claim 32, wherein the peak reduction component of the modified signal is a basis function of the transmitter that is added to the information component such that the addition of the basis function to the information component maps the information component to a selected duplicate constellation point of the one or more duplicate constellations.

43. A multi-carrier communication system as recited in claim 42 further comprising:
   a receiver that receives the multi-carrier symbol transmitted by the transmitter, wherein the modified signal of the transmitted multi-carrier symbol is mapped by the receiver from the selected duplicate constellation point of the modified signal to the associated information signal constellation.

44. A multi-carrier communication system as recited in claim 43, wherein the receiver maps the modified signal from the selected duplicate constellation point of the modified signal to the associated information signal constellation by performing a modulo operation on the modified signal.

45. A multi-carrier communication system as recited in claim 44, wherein the kernel applicator reduces the peak to average power ratio of the multi-carrier symbol as measured at the receiver.

46. A multi-carrier communication system as recited in claim 45, wherein the transmitter transmits the multi-carrier symbol to the receiver through a channel such that the kernel applicator takes into account a characteristic of the channel to reduce the peak to average power ratio of the multi-carrier symbol as measured at the receiver.

47. A multi-carrier communication system as recited in claim 32, wherein the kernel applicator retains information about the reduction of the peak to average power ratio of the multi-carrier symbol such that the transmitter also transmits the information to a receiver to facilitate decoding of the transmitted multi-carrier symbol.

48. A multi-carrier communication system as recited in claim 32, wherein the kernel applicator reduces the peak to average power ratio of the multi-carrier symbol as measured at the transmitter.

49. A multi-carrier communication system as recited in claim 32, wherein each of the plurality of information signals are centered at each of a plurality of frequencies, wherein a selected frequency of the plurality of frequencies is selected to carry the modified signal.

50. A multi-carrier communication system as recited in claim 49, wherein the selected frequency is selected from the plurality of frequencies to facilitate the reduction of the peak to average power ratio of the multi-carrier symbol.

51. A method of reducing a peak to average power ratio of a communication system symbol, wherein the symbol is a function of a plurality of signals, wherein each of the plurality of signals is based at least in part upon an associated signal constellation that includes a plurality of signal constellation points, the method comprising:
   detecting a peak in the symbol;
   determining a first signal that contributes to the peak, the first signal being one of the plurality of signals; and
   mapping the first signal from the associated signal constellation to a selected duplicate constellation point of a selected duplicate constellation of one or more duplicate constellations to reduce the peak to average power ratio of the symbol.

52. A method as recited in claim 51 further comprising:
   transmitting the symbol to a receiver; and
   decoding the symbol when the receiver receives the transmitted symbol including decoding the modified first signal.

53. A method as recited in claim 51, the method further comprsing:
   repeating the steps of detecting, determining and mapping until the peak to average power ratio is reduced to a predetermined level.

54. A method as recited in claim 51, wherein decoding the modified first signal includes performing a modulo operation on the modified first signal.

55. A method of reducing a peak to average power ratio of a multi-carrier symbol of a multi-carrier communication system, wherein the multi-carrier symbol is a function of a plurality of signals, wherein each of the plurality of signals is centered at each one of a plurality of frequencies, further wherein each of the plurality of signals is a quadrature amplitude modulated signal that is based at least in part upon an associated signal constellation that includes a plurality of signal constellation points, the method comprising:
   detecting a peak in the multi-carrier symbol;

determining a first signal that contributes to the peak, the first signal being one of the plurality of signals; and applying a peak reduction component to the first signal by mapping the first signal from the associated signal constellation to a selected duplicate constellation point of a selected duplicate constellation of one or more duplicate constellations to reduce the peak to average power ratio of the multi-carrier symbol;

transmitting the multi-carrier symbol to a receiver;

decoding the multi-carrier symbol when the receiver receives the transmitted multi-carrier symbol including decoding the modified first signal.

56. A method as recited in claim 55, wherein the peak reduction component is a basis function of the transmitter.

57. A method as recited in claim 55, the method further comprising:

repeating the steps of detecting, determining and applying until the peak to average power ratio is reduced to a predetermined level.

58. A method as recited in claim 55, wherein decoding the modified first signal includes performing a modulo operation on the modified first signal.

59. A method as recited in claim 55, the method further comprising:

transmitting information about the reduction of the peak to average power ratio of the multi-carrier symbol, wherein the information facilitates the decoding of the multi-carrier symbol.

60. A method as recited in claim 55, wherein the peak reduction component is a basis function of the transmitter that is applied to the first signal such that the addition of the basis function to the first signal maps the first signal to the selected duplicate constellation point of the one or more of duplicate constellations.

61. A method as recited in claim 60, wherein the decoding the first signal includes:

mapping the modified signal from the selected duplicate constellation point to the associated signal constellation to obtain the first signal.

62. A method as recited in claim 61, wherein mapping the modified signal from the selected duplicate constellation point of the first signal is accomplished by performing a modulo operation on the modified signal.

63. A communication system transmitter configured to transmit a signal having a peak to average power ratio and being a function of a plurality of information symbols, a selected information symbol of the plurality of information symbols being modified to reduce the peak to average power ratio of the signal;

wherein each one of the plurality of information symbols is based at least in part upon an associated signal constellation that includes at least one signal constellation point;

wherein the selected information symbol includes at least one duplicate constellation, each duplicate constellation including at least one duplicate constellation point, wherein at least one of the signal constellation points is mapped to at least one of the duplicate constellation points.

64. A transmitter for use in a communication system, the transmitter transmitting a signal wherein the transmitted signal has a peak to average power ratio and is a function of a plurality of information symbols, each symbol being transmitted at each one of a plurality of intervals of time, a selected information symbol of the plurality information symbols including an information component and a peak reduction component, wherein the peak reduction component modifies the information component and reduces the peak to average power ratio of the transmitted wherein each one of the plurality of information symbols is a quadrature amplitude modulated symbols that is based in at least in part upon an associated information signal constellation that includes a plurality of information constellation points wherein the selected information symbol includes a one or more duplicate constellations, each of the one or more duplicate constellations including a plurality of duplicate constellation points, wherein the plurality of information signal constellation points of the associated information signal constellation are mapped to the plurality of duplicate constellation points of the one or more duplicate constellations.

65. A transmitter as recited in claim 64, wherein the peak reduction component of the modified signal is a basis function of the transmitter.

66. A transmitter as recited in claim 65, wherein the communication system has an impulse response such that the basis function is the impulse response of the communication system.

67. A transmitter as recited in claim 64, wherein the peak reduction component of the selected information symbol is a basis function of the transmitter that is added to the information component such that the addition of the basis function to the information component maps the information component to a selected duplicate constellation point of the one or more duplicate constellations.

* * * * *

UNITED STATES PATENT AND TRADEMARK OFFICE
CERTIFICATE OF CORRECTION

PATENT NO. : 6,512,797 B1
DATED : January 28, 2003
INVENTOR(S) : Tellado et al.

It is certified that error appears in the above-identified patent and that said Letters Patent is hereby corrected as shown below:

Column 8,
Line 6, the equation "$\min_c \|x+c\|_\infty = \min_{\hat{c}} \|x + \hat{Q}\hat{C}\|_\infty$" should read -- "$\min_c \|x+c\|_\infty = \min_{\hat{c}} \|x + \hat{Q}\hat{C}\|_\infty$" --.

Column 14,
Line 37, "transmLitter" should read -- transmitter --.

Column 18,
Line 17, "(500(t)" should read -- (500(t)) --.

Column 31,
Line 23, "36" should read -- 35 --.

Column 32,
Line 51, "comprsing" should read -- comprising --.

Signed and Sealed this

Seventeenth Day of August, 2004

JON W. DUDAS
*Acting Director of the United States Patent and Trademark Office*